United States Patent [19]

Hillis

[11] Patent Number: 5,008,815
[45] Date of Patent: Apr. 16, 1991

[54] PARALLEL PROCESSOR
[75] Inventor: W. Daniel Hillis, Brookline, Mass.
[73] Assignee: Thinking Machines Corporation, Cambridge, Mass.
[21] Appl. No.: 184,739
[22] Filed: Jun. 27, 1988

Related U.S. Application Data

[63] Continuation of Ser. No. 499,474, May 31, 1983, Pat. No. 4,814,973.

[51] Int. Cl.$^5$ .............................................. G06F 15/16
[52] U.S. Cl. ................................ 364/200; 364/231.9; 364/241.2; 364/242.6
[58] Field of Search ... 364/200 MS File, 900 MS File

[56] References Cited

U.S. PATENT DOCUMENTS

| | | | |
|---|---|---|---|
| 3,970,993 | 7/1976 | Finnila | 364/200 |
| 3,979,728 | 9/1976 | Reddaway | 364/200 |
| 4,229,790 | 10/1980 | Gilliland | 364/200 |
| 4,270,170 | 5/1981 | Reddaway | 364/200 |
| 4,380,046 | 4/1983 | Frosch et al. | 364/200 |
| 4,523,273 | 6/1985 | Adams et al. | 364/200 |
| 4,543,630 | 9/1985 | Neches | 364/200 |

OTHER PUBLICATIONS

W. Hillis, "New Computer Architecture and Their Relationship to Physics", International Journal of Theoretical Physics, vol. 21, Nos. 3/4, 1982, pp. 255–262.
W. Hillis, "The Connection Machine", 9/81, MIT Artificial Intelligence Laboratory, Memo No. 646.
G. Adams, "The Extra Stage Cube", IEEE Transactions on Computer, vol. C-31, No. 5, 5/82, pp. 397–408.
J. Bochus, "Can Programming Be Liberated from the Von Neuman Style?", ACM Turing Award Lecture 1977.
A. Rosenfeld, "Parallel Image Processing Using Cellular Arrays", Computer, vol. 6, No. 1, pp. 14–20, 1/1987.
M. Pease, "The Indirect Binary n-Cube Microprocessor Array", IEEE Transactions Computers, vol. C-26, No. 5, 5/1977.
T. Feng, "A Survey of Interconnection Networks", Computer 12/1981, pp. 12–27.
J. Hayes, "A Microprocessor-Based Hyper Cube Super-Computer", 1986 IEEE, pp. 6–17.
F. Preparata, "The Cube-Connected Cycles: A Versatile Network for Parallel Computer", 5/1981, vol. 24, #5, Communication of the ACM.
Wu, "Interconnection Networks for Parallel and Distributed Processing", IEEE, 1984.
"SIEGET", The Multistage Cube: A Versatile Interconnection Network, Computer 1981, pp. 65–76.

*Primary Examiner*—David Y. Eng
*Attorney, Agent, or Firm*—Pennie & Edmonds

[57] ABSTRACT

A parallel processor array is disclosed comprising an array of processor/memories and means for interconnecting these processor/memories in an n-dimensional pattern having at least $2^n$ nodes through which data may be routed from any processor/memory in the array to any other processor/memory. Each processor/memory comprises a read/write memory and a processor for producing an output depending at least in part on data read from the read/write memory and on instruction information. The interconnecting means comprises means for generating an address message packet that is routed from one processor/memory to another in accordance with address information in the message packet and a synchronized routing circuit at each node in the n-dimensional pattern for routing message packets in accordance with the address information in the packets. Preferably the address information in the message packet is relative to the node in which the message packet is being sent and each digit of the address represents the relative displacement of the message packet in one dimension from the node to which the message packet is being sent. Advantageously, the n-dimensional pattern is a Boolean cube of 15 dimensions. With presently available technology, more than one million such processor/memories can be operated in parallel while interconnected by these interconnecting means.

16 Claims, 19 Drawing Sheets

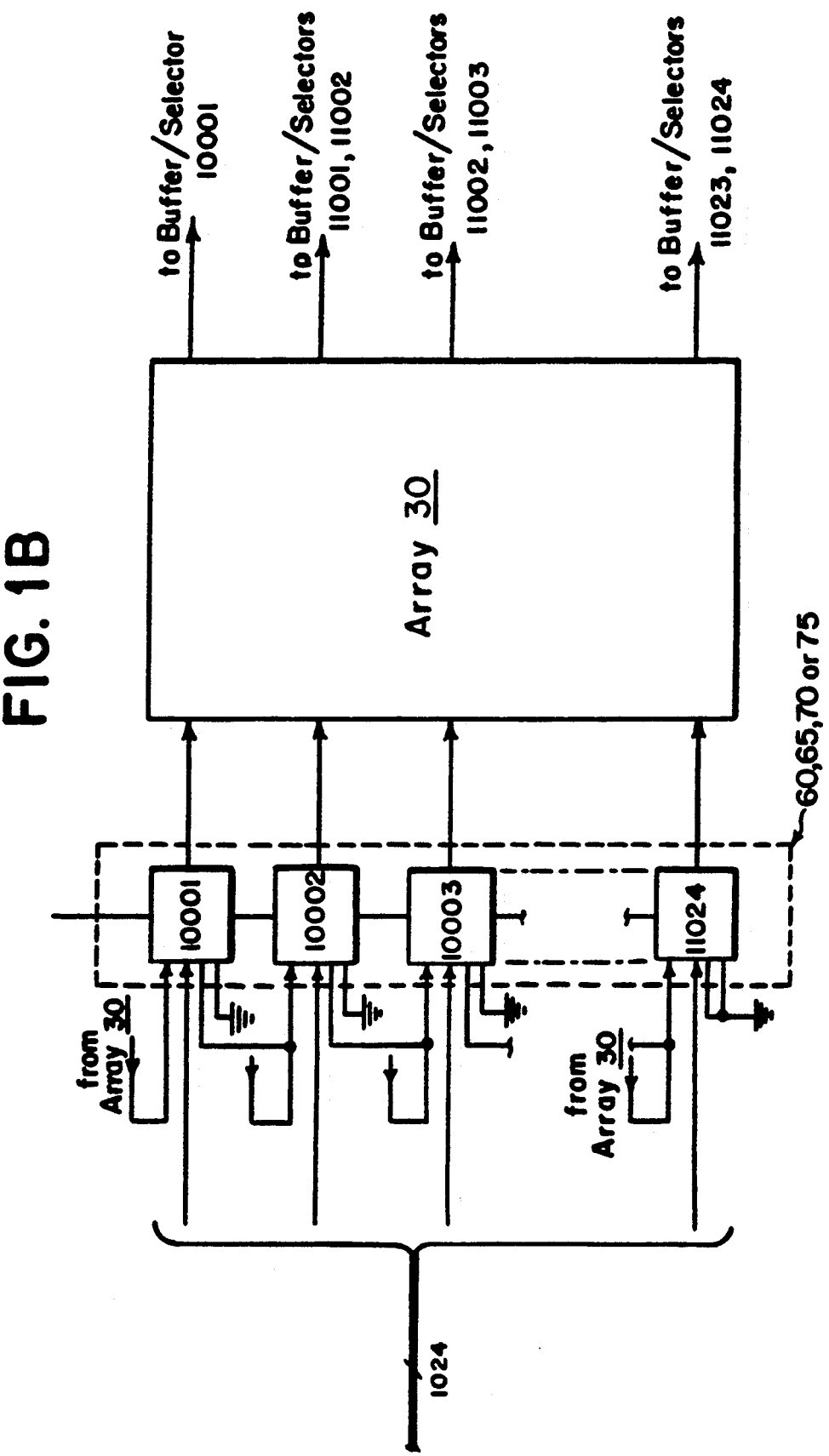

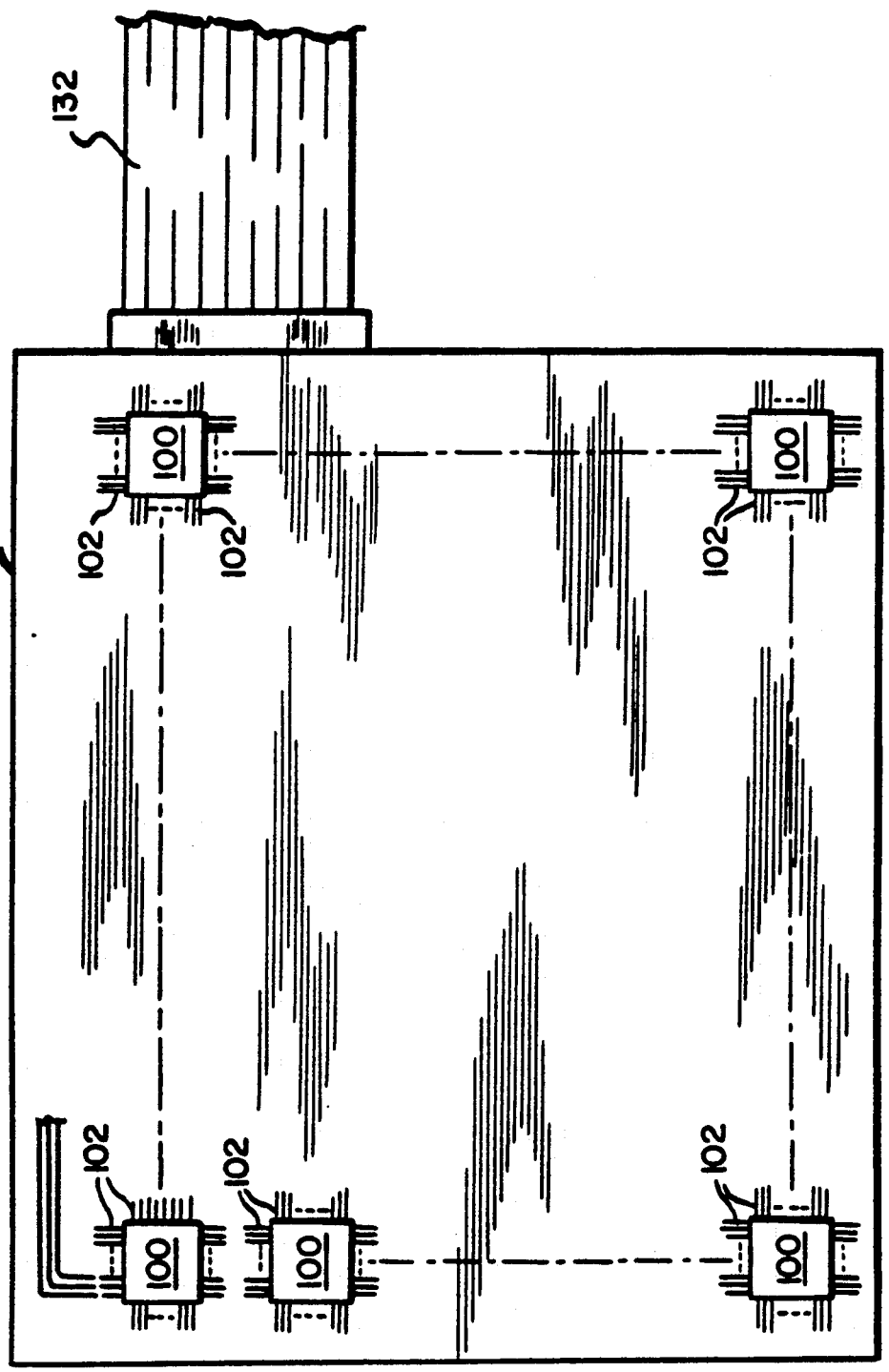

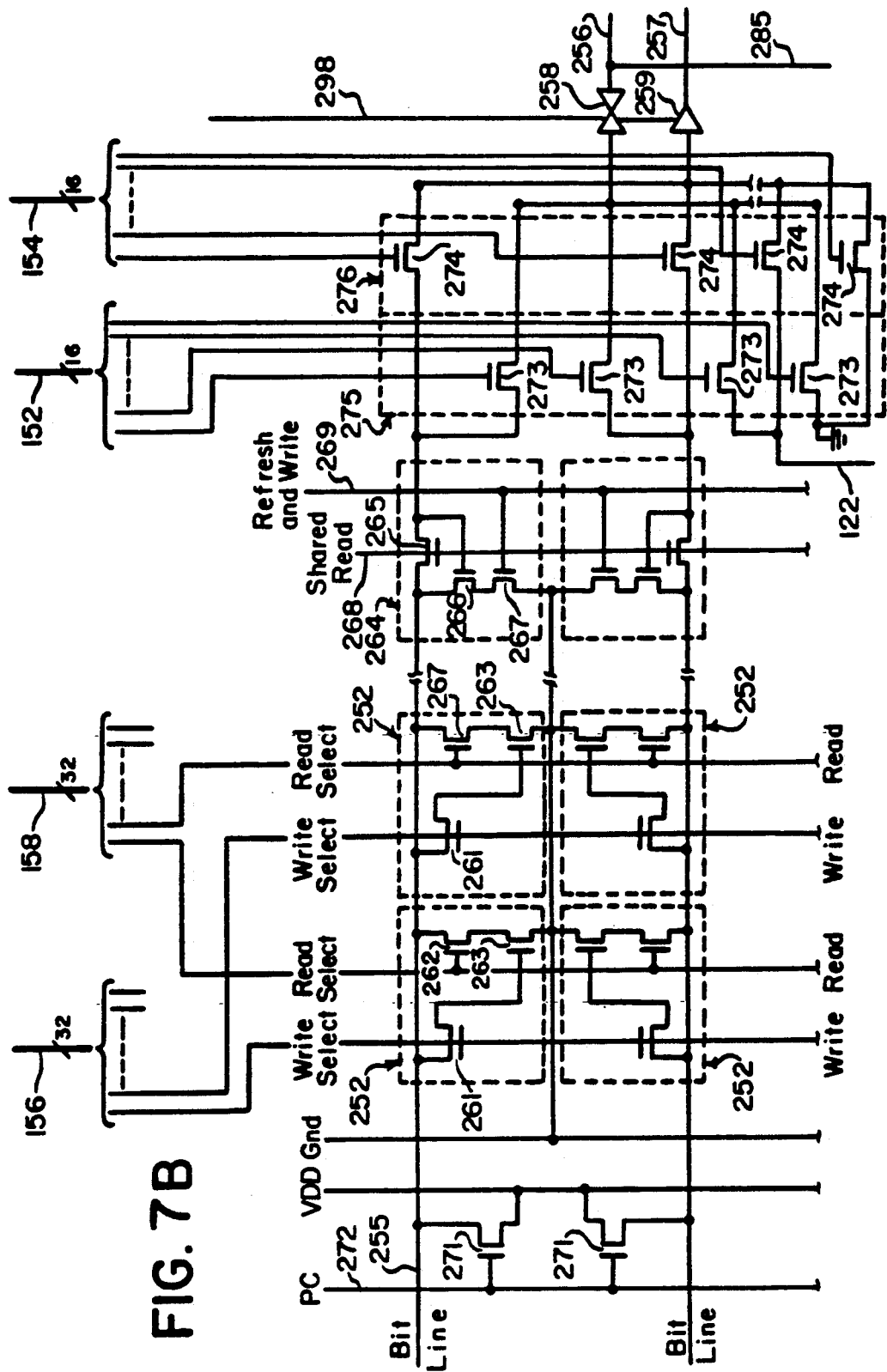

PARALLEL PROCESSORThis is a continuation of application Ser. No. 499,474 filed May 31, 1983 now U.S. Pat. No. 4,874,973 issued Mar. 21, 1989.

CROSS-REFERENCE TO RELATED APPLICATION

A related application is Processor/Memory Circuit filed concurrently herewith by W. Daniel Hillis and others which has issued as U.S. Pat. No. 4,709,327.

BACKGROUND OF THE INVENTION

This relates to a computer that uses parallel processors and, in particular, to one that uses a vastly greater number of parallel processors than previously.

A typical digital computer includes a central processing unit (CPU), a memory which stores data and a program for controlling the computer, and various input and output devices. The stored program is a series of instructions that directs the CPU to perform certain arithmetic, transfer or logical operations on the data available to the computer. Such data are ultimately provided to the computer from the input devices, and the results of the CPU operations are supplied to the output devices. In the typical computer this series of instructions is executed serially one-at-a-time.

In the forty or so years that digital computers have been used, the computers and the programs that run them have become more and more complex. Increasing complexity in a serial computer is usually manifested by increases in the size of its memory and the programs and/or data stored therein. In some senses, however, these more complicated serial computers have become less and less efficient. At any given time, only a very small part of the serial computer is actually being used because the instruction that is being executed by the CPU is obtained from no more than a few memory locations and affects data at only a few other locations. Moreover, as the computer becomes smarter in terms of the size of its memory, it becomes dumber in terms of its ability to produce an output from its memory because the time required to retrieve data from the memory increases with the amount of data stored in the memory.

These problems with serial computers have been called the von Neumann Bottleneck, after John von Neumann who contributed so much to the early development of the serial computer. See J. Backus, "Can Programming Be Liberated from the Von Neumann Style?", *Communications of the ACM*, Vol. 21, No. 8, p. 613 (August 1978).

These problems are particularly acute in the field of Artificial Intelligence where the computer is often called upon to retrieve knowledge stored in a network of interrelationships that is often referred to as a semantic network. Retrieving this knowledge may involve searching the entire network. It may also involve deducing the desired fact from other stored information. In performing such retrieval, a few simple operations are often repeated for most of the operating time of the program. Such operations include:

1. the sorting of a set of data according to some parameter such as size or numerical order;
2. the searching of ordered sets of data or graphs for sub-sets or sub-graphs with a specified structure;
3. the matching of patterns against sets of assertions;
4. the deduction of facts from the semantic networks of stored information.

Performing such operations one-at-a-time can be prohibitively expensive in terms of computer time and facilities. As a result, numerous problems in Artificial Intelligence cannot be addressed by presently available serial computers. These problems, however, are fundamental problems such as image processing for which solutions are urgently needed.

Alternatively, the time for performing such operations can be reduced if it is possible to perform such operations in parallel. The desirability of doing such is well recognized. See, for example, C. Mead and L. Conway, *Introduction to VLSI Systems*, ch. 8, "Highly Concurrent Systems", Addison Wesley (1980), and the references cited therein; W. D. Hillis, "The Connection Machine", Massachusetts Institute of Technology Artificial Intelligence Laboratory Memo No. 646 (September 1981) and the references cited therein; also A. Rosenfeld, "Parallel Image Processing Using Cellular Arrays", *Computer*, Vol. 16, No. 1, p. 14 (January 1983).

These documents also describe to varying degrees general concepts of devices for performing parallel operations on data. For example, Hillis and Rosenfeld contemplate an array of identical processor/memories, each of which contains both the hardware required to store data and that required to process it. However, the specific details of a fully operating computer including the interconnection of processor/memories and their control are not the subject of these papers.

SUMMARY OF THE INVENTION

I have devised a parallel process array comprising an array of processor/memories and means for interconnecting these processor/memories in an n-dimensional pattern having at least $2^n$ nodes through which data may be routed from any processor/memory in the array to any other processor/memory. Advantageously, the n-dimensional pattern is a Boolean cube of 15 dimensions.

Each processor/memory comprises a read/write memory and a processor for producing an output depending at least in part on data read from the read/write memory and on instruction information. The interconnecting means comprises means for generating an addressed message packet that is routed from one processor/memory to another in accordance with address information in the message packet and a routing circuit at each node in the n-dimensional pattern for routing message packets in accordance with the address information in the packets.

In a preferred embodiment of the invention, the processor/memories are also interconnected in a 2-dimensional pattern in which individual processor/memories are directly connected to processor/memories that are adjacent to them in the 2-dimensional pattern.

With presently available technology, more than one million such processor/memories can be operated in parallel while interconnected by these interconnecting Preferably the address information in the message packet is relative to the node in which the message packet is being sent and each digit of the address represents the relative displacement of the message packet in one dimension from the node to which the message packet is being sent. For each dimension of the n-dimensional pattern, the routing circuit comprises logic for determining if the message packet has reached its destination in that dimension and for routing it on to another node in that dimension if it has not and if a connection to that node is available. When the connection from the first destination determining logic to another node is not available or when the first destination determining logic determines that the message packet has reached its destination in that dimension, the routing circuit provides the message packet to similar logic for determining if the message packet has reached its destination in a second dimension. Further, the routing circuit comprises logic for providing a message packet that has reached its destination node to a processor/memory at that node as well as means for storing message packets when they cannot be routed on because of connection conflicts.

Advantageously, the destination determining logic and the routing logic for each dimension are operated simultaneously throughout all nodes of the n-dimensional pattern. As a result, a message packet can be routed through the entire n-dimensional pattern during a single routing cycle. In addition, each routing circuit is small enough that it can be fabricated on a single integrated circuit chip along with several processor/memories.

BRIEF DESCRIPTION OF THE DRAWINGS

These and other objects, features and advantages of the invention will be more readily apparent from the following detailed description of the preferred embodiment of the invention in which:

FIGS. 1A and 1B are schematic depictions of a computer system using an array of parallel processing integrated circuits (ICs) in accordance with the invention;

FIG. 5 is a schematic illustration of a printed-circuit board mounting several VLSI packages containing parallel processing ICs;

FIGS. 7A and 7B are block diagrams of one of the processor/memories depicted in the block diagram of FIG. 6A;

DETAILED DESCRIPTION OF PREFERRED EMBODIMENT OF THE INVENTION

For the convenience of the reader, this description of the preferred embodiment of the invention is divided into the following sections:
General Description of the System
General Description of a Parallel Processing IC
Description of Processor/Memory
Description of Communication Interface Unit
Description of Routing Circuit
Example
Alternatives

General Description of the System

Figure 1A:
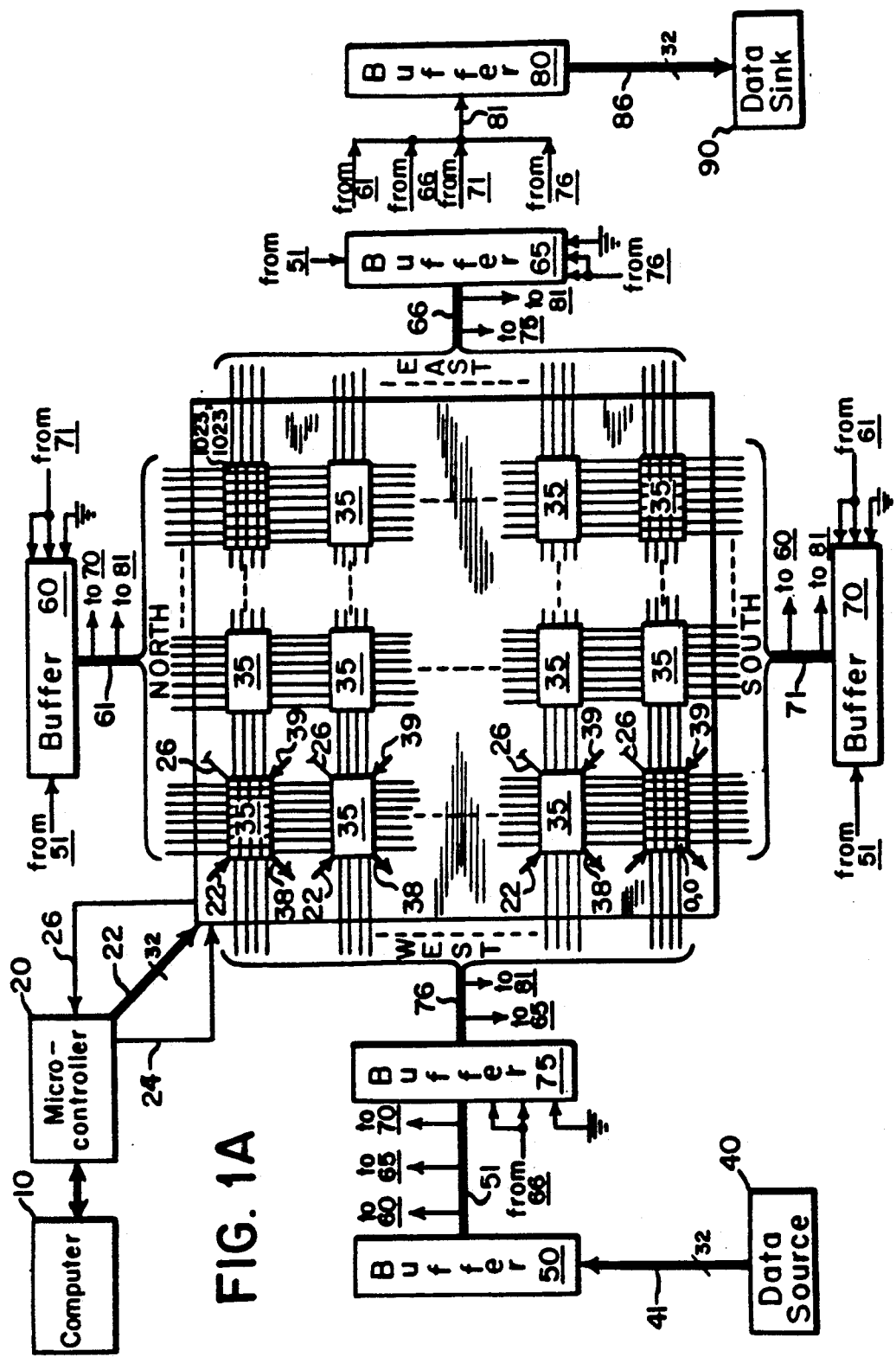

As shown in FIG. 1A, the invention may be practiced in a computer system that comprises a mainframe computer 10, a microcontroller 20, an array 30 of parallel processing integrated circuits 35, a data source 40, a first buffer and multiplexer/demultiplexer 50, first, second, third and fourth bidirectional bus control circuits 60, 65, 70, 75, a second buffer and multiplexer/demultiplexer 80, and a data sink 90. Mainframe computer 10 may be a suitably programmed commercially available general purpose computer such as a VAX computer manufactured by Digital Equipment Corp. Microcontroller 20 is an instruction sequencer of conventional design for generating a sequence of instructions that are applied to array 30 by means of a thirty-two bit parallel bus 22. One of the thirty-two lines in bus 22 supplies array 30 with a RESET signal; three lines supply timing signals; and the other twenty-eight lines are available for transmission of instructions. Additional addressing signals to address individual parallel processing ICs 35 of array 30 are supplied to the array on bus 24. Microcontroller 20 receives from array 30 a signal on line 26. This signal is a general purpose or GLOBAL signal that can be used for data output and status information. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

Array 30 contains 32,768 ($=2^{15}$) identical ICs 35; and each IC 35 contains 32 ($=2^5$) processor/memories 36. Thus the entire array 30 contains 1,048,576 ($=2^{20}$) identical processor/memories 36.

Processor/memories 36 are organized and interconnected in two geometries. The first is a conventional two-dimensional grid pattern in which the processor/memories are organized in a square array and connected to their four nearest neighbors in the array. The second is a Boolean n-cube of fifteen dimensions. To connect processor/memories 36 in a two-dimensional grid pattern, ICs 35 of array 30 are organized in a rectangular array of 256 ($=2^8$) rows and 128 ($=2^7$) columns; and the 32 processor/memories of each IC are connected in a rectangular array of 4 ($=2^2$) rows and 8 ($=2^3$) columns. As a result, the 1,048,576 processor/memories 36 of array 30 are connected in a square of 1024 ($=2^{10}$) rows and 1024 columns. For convenience, the sides of this square array are identified as NORTH, EAST, SOUTH and WEST. To connect each processor/memory to its four nearest neighbors, the individual processor/memories are connected by electrical conductors between adjacent processor/memories in each row and each column; and the four nearest neighbors of any IC except those on the edges of the array will be recognized to be the four ICs immediately adjacent that IC on the North, East, South and West, respectively.

The individual processor/memories 36 in the columns and rows of the two-dimensional array may be identified by systematically numbering them, using a first number to represent their column number or position in the first dimension and a second number to represent their row number or position in the second dimension. For example, if we number the columns starting with zero in the left-hand or Westernmost column and the rows starting with zero in the bottom or Southernmost row, the nine processor/memories nearest the bottom left-hand or Southwest corner are identified or addressed by:

| 0, 2 | 1, 2 | 2, 2 |
|------|------|------|
| 0, 1 | 1, 1 | 2, 1 |
| 0, 0 | 1, 0 | 2, 0 | and the processor/memory in the upper right-hand or Northeast corner is identified by the numbers 1023, 1023. Each such pair of numbers will be referred to as the address of the associated processor/memory.

For this numbering scheme, it will be recognized that the four nearest neighbors of any processor/memory in the two-dimensional array have an address that differs from the address of that processor/memory by 1 in only one of the two numbers that make up their addresses. For example, the four nearest neighbors of the processor/memory having the address 1, 1 are the four processor/memories at addresses 1, 2; 2, 1; 1, 0; 0, 1 to the North, East, South and West, respectively.

As shown schematically in FIG. 1A, the two-dimensional grid pattern of array 30 extends beyond the Northern, Eastern, Southern and Western edges of array 30 to first, second, third and fourth bidirectional bus control circuits 60, 65, 70, 75 and to first and second buffers 50, 80. In particular, each of the 1024 processor/memories 36 on each of the four edges of the array is connected by one of 1024 bidirectional leads 61, 66, 71, 76 to bus control circuits 60, 65, 70, 75, respectively.

Data source 40 supplies input data over high speed data bus 41 to buffer and multiplexer/demultiplexer 50. Data source 40 may be any source of data such as a computer terminal, a communication line, a visual, audible or tactile input, a radar or sonar system, a disk file or a combination thereof. Illustratively data bus 41 may be a thirty-two bit wide bus and buffer 50 may be thirty-two serial-input, parallel-output shift registers, each of which has a thirty-two bit capacity. In such a configuration, each line of bus 41 feeds a separate serial-input shift register and there is no need for conventional multiplexing or demultiplexing. Where the number of lines in bus 41 is different from the number of shift registers, multiplexing or demultiplexing circuits are used to distribute the data from the individual data lines of bus 41 to the serial inputs of the shift registers in buffer 50.

Buffer 50 supplies the data in parallel on a 1024 line bus 51 to one of bus control circuits 60, 65, 70, 75 which provides these data via busses 61, 66, 71 or 76 to the processor/memories at the outer edge of the array on the side to which it is connected.

Data from array 30 are provided in parallel on one of busses 61, 66, 71 or 76 from the processor/memories circuits 60, 65, 70, 75 which switches the data onto a bus 81 that is connected to the input to buffer 80. The output of buffer 80 is a high speed data bus 86 that is connected to data sink 90. Buffer 80 illustratively is an array of thirty-two parallel-input, serial-output shift registers, each of which has a thirty-two bit capacity; and data bus 86 may be a thirty-two bit wide bus. For this configuration, there is no need for conventional multiplexing or demultiplexing. When the number of data lines in bus 86 is different from the number of shift registers in buffer 80, multiplexing or demultiplexing circuits are used to provide the data from the serial outputs of the shift registers to the individual data lines of bus 86. Data sink 90 may be any sink of data such as a computer terminal, a communication line, a display, a printer, a plotter, a voice synthesizer, a mechanical device, a robot, a disk file or a combination thereof.

The direction of data flow through array 30 is controlled by microcontroller 20 and bus control circuits 60, 65, 70, 75 and may be from East to West, North to South, or vice versa. As shown in FIG. 1B, each buffer 60, 65 70 or 75 contains 1024 selectors 10,001, 10,002, 10,003 . . . 11,024. Each selector has four signal inputs and four input selector lines. One of the signal inputs to each selector is one of the lines of data bus 51 from bus 50. Another signal input is ground. The other two signal inputs are outputs from array 30. In one case the input is the output from the array in the same row or column as the selector. In the other case the input is the output from the array in the row or column immediately adjacent the selector. In the case of the bottommost selector, two of the inputs to the selector are grounded. Each of the four input selector lines selects one of the four signal inputs to be the output from each selector. Signals on the four input selector lines are generated by microcontroller 20.

As a result of this arrangement, each buffer may provide to the array one of four sets of signals: the data input from buffer 50, recirculated data from array 30, recirculated data from an adjacent row or column in array 30, and all zeroes. In the case of recirculated data from an adjacent row or column, the buffer, in effect, has interconnected all the individual processor/memories of the array in a single line that spirals through the 1024 rows or columns of the array.

The above-described two-dimensional grid of interconnections is useful both for writing large amounts of data into array 30 as, for example, at the beginning of a computation and for reading out the contents of the array, for example, when it is necessary to interrupt processing and store the state of the array at such time. However, this interconnection array does not provide for rapid interchange of data in random directions between processor/memories 36 in the two-dimensional array. Moreover, to move data between an edge of the array and a specific processor/memory, it is necessary to shift it through all the processor/memories between the edge and the processor/memory of interest, which may require shifts through more than 500 processor/memories. Even where it is possible to make a single such shift at very high speeds, the need to do more than 500 such shifts makes the complete operation maddeningly slow. With the added complications of making such shifts at the same time for large numbers of processor/memories in random and independent directions, it becomes impossible to operate such a large two-dimensional grid of processor/memories at reasonable cost.

In the present invention, this problem is alleviated by also organizing and interconnecting processor/memories 36 in accordance with a second geometry. In particular, ICs 35 are organized and interconnected in the form of a Boolean n-cube of fifteen dimensions. Each IC is provided with logic circuitry to control the routing of messages through such an interconnection network; and within each IC, bus connections are provided to the thirty-two processor/memories so that every one of the more than one million processor/memories can send a message to every other. Moreover, large numbers of messages may be sent at any time and the messages may be routed in random directions.

To understand this connection pattern for ICs 35, it is helpful to number the ICs from 0 to 32,767 and to express these numbers or addresses in binary notation using fifteen binary digits as in Table I.

TABLE I

| IC address in decimal notation | IC address in binary notation | | | | |
|---|---|---|---|---|---|
| 0 | 000 | 000 | 000 | 000 | 000 |
| 1 | 000 | 000 | 000 | 000 | 001 |
| 2 | 000 | 000 | 000 | 000 | 010 |
| 3 | 000 | 000 | 000 | 000 | 011 |
| 4 | 000 | 000 | 000 | 000 | 100 |
| . | . | . | . | . | . |
| . | . | . | . | . | . |
| . | . | . | . | . | . |
| 32765 | 111 | 111 | 111 | 111 | 101 |
| 32766 | 111 | 111 | 111 | 111 | 110 |
| 32767 | 111 | 111 | 111 | 111 | 111 |

The concepts described above in reference to the interconnection of a two-dimensional grid can be readily extended to the interconnection of a fifteen-dimensional grid. Just as we identified each processor/memory 36 by two numbers, one of which specified its position in the first dimension of the two-dimensional grid and the other of which specified its position in the second dimension, so too we can use a number to identify the position of a IC in each of the fifteen dimensions of the Boolean 15-cube. In an n-cube, however, an IC can have one of only two different positions, 0 and 1, in each dimension. Thus, the fifteen-digit IC address in binary notation as set forth in Table I also specifies the IC's position in the fifteen dimensions of the n-cube. For convenience, we will use the left-hand-most digit of the fifteen binary digits to specify the IC's position in the first dimension, and so on in order to the right-hand-most digit which specifies the IC's position in the fifteenth dimension.

Moreover, because a binary digit can have only two values, zero or one, and because each IC is identified uniquely by fifteen binary digits, each IC has fifteen other ICs whose binary address differs by only one digit from its own address. We will refer to these fifteen ICs whose address differs by only one from that of a first IC as the first IC's nearest neighbors. Those familiar with the mathematical definition of a Hamming distance will recognize that the first IC is separated from each of its fifteen nearest neighbors by the Hamming distance one. Two examples of the addresses of an IC and its fifteen nearest neighbors are set forth in Table II.

TABLE II

| Example I | Example II |
|---|---|
| IC address: | |
| 000 000 000 000 000 | 010 101 010 101 010 |
| Addresses of nearest neighbors: | |
| 000 000 000 000 001 | 010 101 010 101 011 |
| 000 000 000 000 010 | 010 101 010 101 000 |

TABLE II-continued

| Example I | Example II |
|---|---|
| 000 000 000 000 100 | 010 101 010 101 110 |
| 000 000 000 001 000 | 010 101 010 100 010 |
| 000 000 000 010 000 | 010 101 010 111 010 |
| 000 000 000 100 000 | 010 101 010 001 010 |
| 000 000 001 000 000 | 010 101 011 101 010 |
| 000 000 010 000 000 | 010 101 000 101 010 |
| 000 000 100 000 000 | 010 101 110 101 010 |
| 000 001 000 000 000 | 010 100 010 101 010 |
| 000 010 000 000 000 | 010 111 010 101 010 |
| 000 100 000 000 000 | 010 001 010 101 010 |
| 001 000 000 000 000 | 011 101 010 101 010 |
| 010 000 000 000 000 | 000 101 010 101 010 |
| 100 000 000 000 000 | 110 101 010 101 010 |

To connect ICs 35 in the form of a Boolean 15-cube, each IC is connected to its fifteen nearest neighbors. In FIG. 1, these connections are schematically represented by fifteen input lines 38 and fifteen output lines 39 although the actual connection paths are not shown because of the complexity they would add to the drawing. Each of these fifteen input lines 38 to each IC 35 is associated with a different one of the fifteen dimensions of the Boolean 15-cube and likewise each of the fifteen output lines 39 from each IC 35 is associated with a different dimension.

Figure 2:
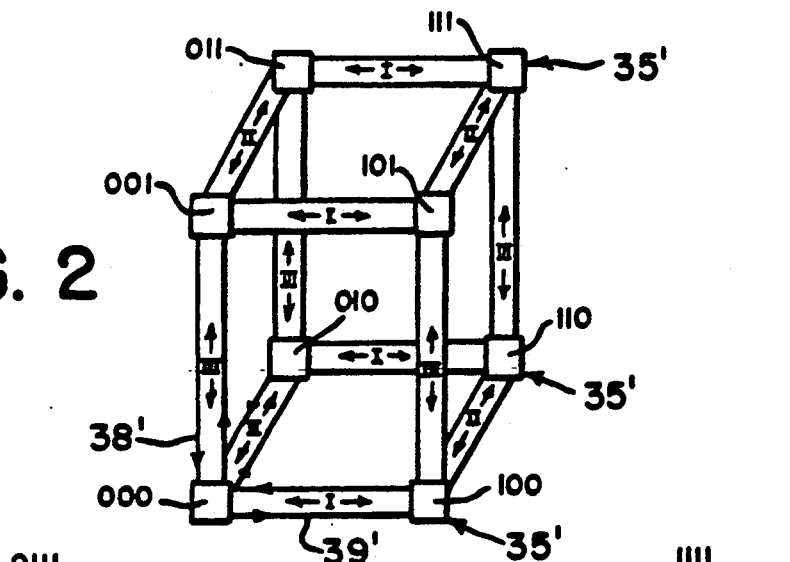
FIGS. 2 and 3 are schematic representations useful in understanding certain of the interconnection patterns between the parallel processing ICs.

An appreciation of the interconnection pattern of a Boolean n-cube can be obtained from a consideration of the interconnections that would be used for an array of ICs 35' in Boolean n-cubes of three dimensions and four dimensions. FIG. 2 is a schematic illustration of the Boolean n-cube of three dimensions. This will be recognized as a conventional cube having eight vertices or nodes and twelve edges. The three dimensions of this cube are identified by Roman numerals, I, II, III. At each of the vertices is an IC 35'; and from each IC there are three output lines 39' that extend along the three dimensions of the cube to the IC's three nearest neighbors. As will be apparent, each IC 35' also has three input lines 38' that are the output lines from its three nearest neighbors. The bottom left-hand vertex is assumed to be the origin of this system and accordingly the IC at this vertex has the 0 position or address in the first, second and third dimensions of the three-dimensional cube of FIG. 2. This address will be written 000. Because each IC can be at one of only two positions in each dimension, the other ICs have addresses that are other three-digit combinations of 0 and 1 as shown in FIG. 2.

Figure 3:
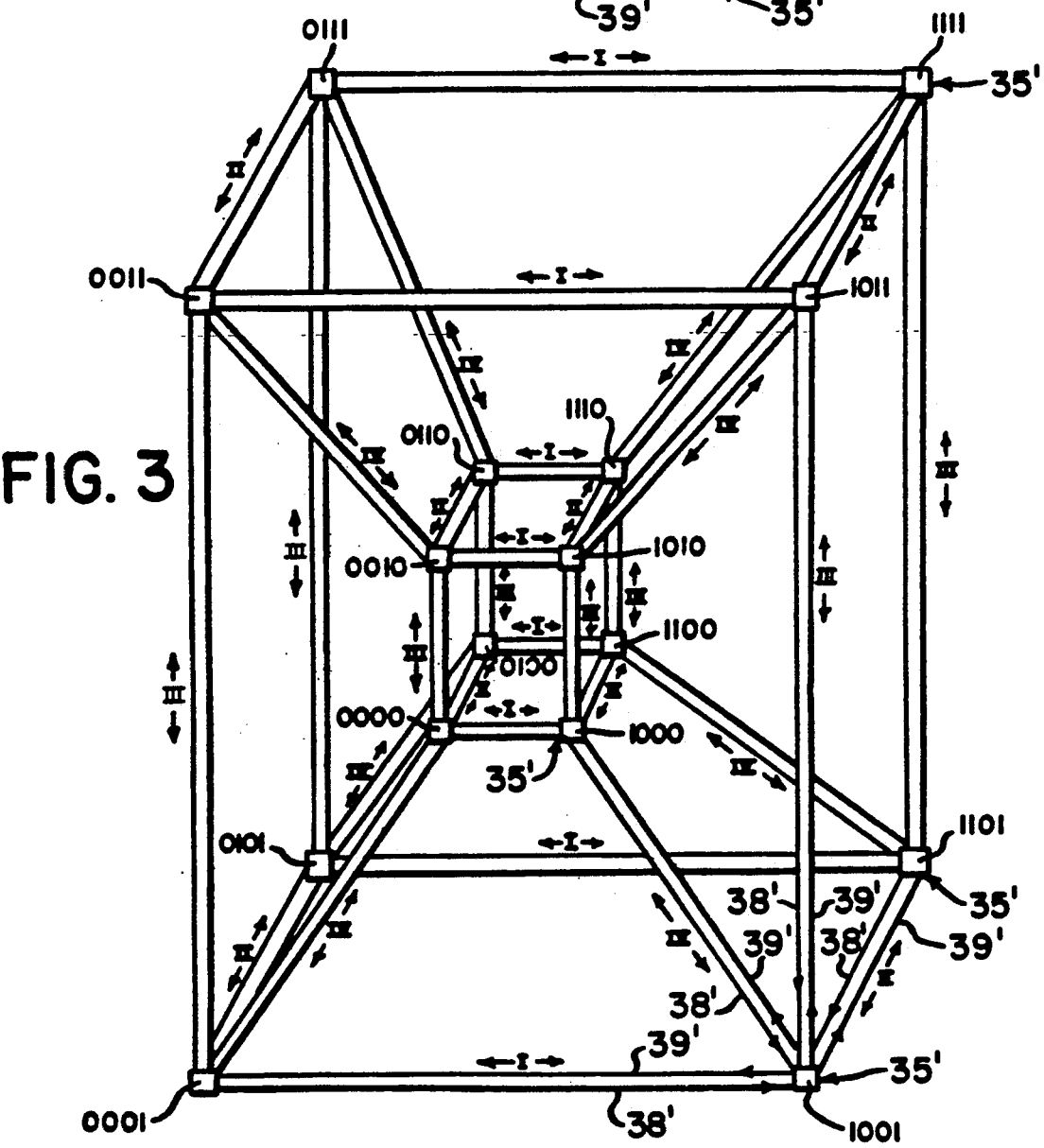

FIG. 3 illustrates a Boolean n-cube of four dimensions. In such a cube there are sixteen vertices and thirty-two edges. Again, an IC 35' is located at each vertex or node and is connected to its nearest neighbors by input lines 38' and output lines 39'. In this case, however, each IC has four nearest neighbors and therefore four input lines and four output lines extending along the four dimensions of the 4-cube. The position of each IC in the Boolean 4-cube is identified by a four-digit binary number as shown in FIG. 3; and the four dimensions of this 4-cube are identified by Roman numerals, I, II, III, IV as shown in FIG. 3.

The extrapolation of this pattern to cubes of higher dimensions will be apparent. In each case, the next higher dimension will have twice as many vertices and each IC will have one additional nearest neighbor. Accordingly, a Boolean 15-cube will have 32,768 vertices with an IC at each vertex and each IC will have fifteen nearest neighbors.

Figure 4:
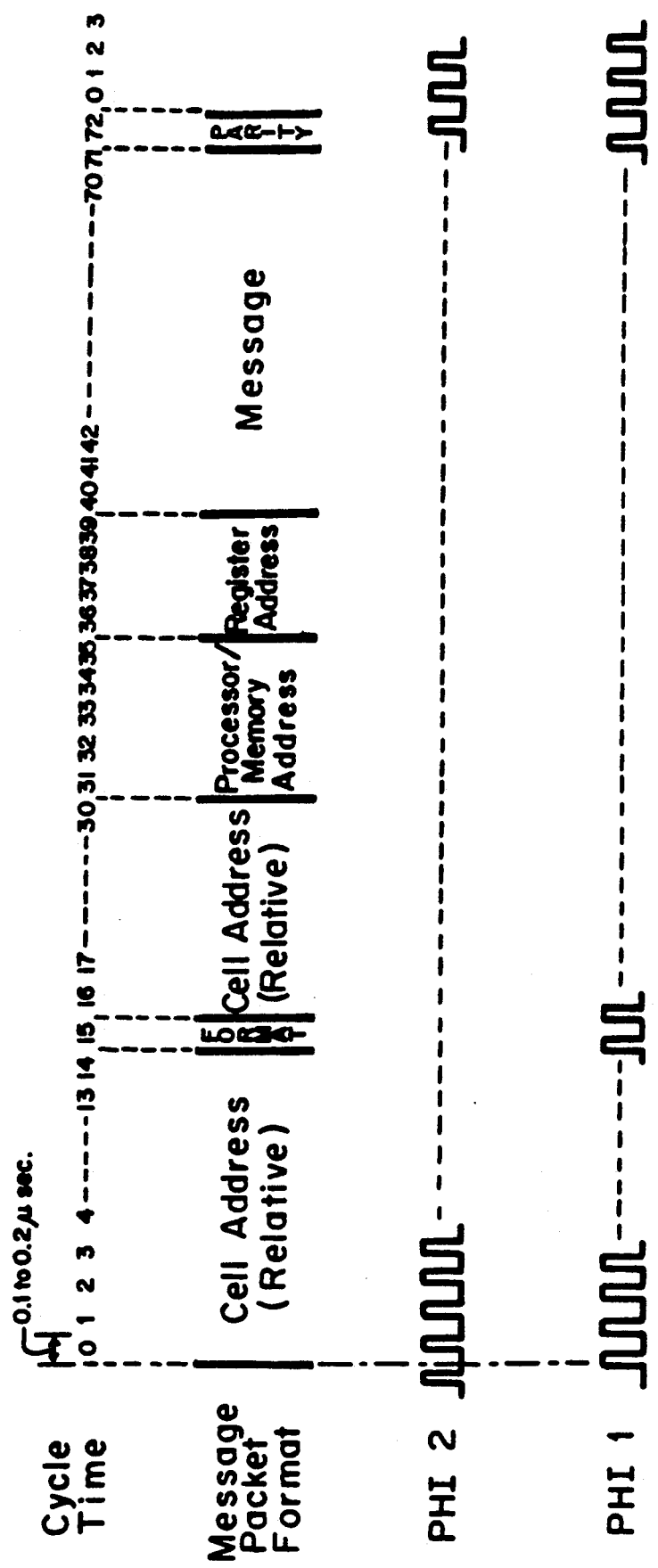
FIG. 4 depicts the format of a message that can be sent from one IC to another in the array of FIG. 1, as well as certain clock signal waveforms useful in understanding the operation of the computer system depicted in FIG. 1.

To permit communication through the interconnection pattern of the Boolean 15-cube, the computer system is operated so that it has both processing cycles and routing cycles. Computations are performed during the processing cycles. During the routing cycles, the results of the computations are organized in the form of message packets; and these packets are routed from one IC to the next by routing circuitry in each IC in accordance with address information that is part of the packet. The format of the message packet is depicted in FIG. 4 where it is seen to comprise fifteen bits of IC address, a format bit, another fifteen bits duplicating the IC address, five bits of address to the processor/memory in the IC, four bits of address to a register in the processor/memory, thirty-two bits of a message and one bit for error detection, a total of seventy-three bits. Optionally additional bits may be provided for error correction. The time duration of each bit illustratively is 0.1 to 1 microseconds corresponding to a frequency of 1 to 10 MegaHertz (MHz). FIG. 4 also illustrates the basic clock signals phi 1 and phi 2 used in the system. These signals are non-overlapping two-phase clocks each having a period and a frequency that is the same as that of one bit of the message packet.

In the message packet, the IC address information is relative to the address of the destination IC. Initially, it is the difference or the displacement between the address of the IC that is the source of the message and that of its destination. For example, if the address of the source IC is 010 101 010 101 010 and the address of the destination IC is 111 111 111 111 111, then the relative address that is generated at the source IC is 101 010 101 010 101. It will be apparent that this relative address is the logical EXCLUSIVE OR (XOR) of the addresses of the source and destination. It also will be apparent that 1-bits in the relative address identify the dimensions where the message packet is not in the correct position and therefore identify the dimensions through which the message packet must be moved to reach the destination IC. Thus, in the above example, where the addresses of the source and destination ICs are the same in each of the even-numbered dimensions, the message is already located in the proper position in those dimensions. However, in the odd dimensions where the addresses of the source and the destination ICs are different, the presence of 1-bits in the relative address for those dimensions indicates that it is necessary to move the message packet from one IC to another in that dimension.

As the message is routed from one IC to the next, the relative address is updated to take into account each move. This is conveniently done by complementing the bits in the duplicate IC address that are associated with the dimensions through which the message packet is moved. As a result, when the message packet arrives at the destination IC, the bits in the duplicate IC address will be all zeroes.

The routing circuitry in all the ICs is identical and operates in synchronism using the same routing cycle. For the example of FIG. 4 of a message packet of seventy-three bits with fifteen bits of IC address, the length of the routing cycle is eighty-eight cycles of the basic clock signal phi 1. In the first time period of each routing cycle, the routing circuitry at each IC tests the leading bit of the first copy of the IC address of each message packet in the routing circuitry to determine its level. If there is a 1-bit in this position and if the output line from that IC which is associated with the first dimension is not already busy, the message packet is routed down the first dimension output line to the IC's nearest neighbor in the first dimension. If the leading bit of the message packet address is a 0-bit, the message packet remains in the same IC because it is in the correct position in the first dimension. As a result, in the first time period, all message flow between the routing circuits of the ICs is along the first dimension.

The leading bit of the first copy of the IC address in the message packet is then discarded. If the message packet was routed to another IC, the corresponding address bit in the duplicate IC address is complemented in order to account for such move.

In the second address time period, the routing circuitry of each IC again tests the leading bit of the message packets present at the IC. However, this bit is the bit that indicates whether the message packet is in the proper position in the second dimension. If the bit is a 1-bit and if the second dimension output line is not already busy, the message packet is then routed out on the second dimension output line to that IC's nearest neighbor in the second dimension. If the first bit is a 0-bit, the message packet remains in the IC.

This process continues through fifteen address time periods, at the end of which the first fifteen address bits of the message packet will have been used up. However, if the needed output lines were available, a path will have been established through the Boolean 15-cube through which the remainder of the message packet can be transmitted.

An illustrative example of this routing scheme may be provided with reference to the Boolean 4-cube of FIG. 3. Assume that a message is to be sent from a source IC 35' having an address 1111 to a destination IC 35' having an address 0010. The relative address or displacement of the destination IC is obtained by taking the EXCLUSIVE OR of the address of the source and destination ICs. Accordingly, the relative address is 1101 which indicates that the message packet must be moved in the first, second and fourth dimensions but not in the third dimension. The routing circuit at the source IC then examines the first bit of the first copy of the relative address, identifies the 1-bit, routes the message along the first dimension to IC 0111 if this output line is available, discards the first 1-bit in the first copy of the IC address, and complements the first 1-bit in the duplicate IC address. In the second address time period, the routing circuit at the IC whose address is 0111 examines the first of the three remaining address bits and again finds a 1-bit. Accordingly, if the output line is available, the routing circuit sends the message packet to the IC whose address is 0011, discards the 1-bit in the first copy of the IC address that is representative of movement in the second dimension, and complements the 1-bit in the duplicate IC address in order to indicate that such movement has taken place.

In the third address time period, the routing circuit at address 0011 examines the first of the two remaining address bits and identifies a 0-bit. It therefore retains the message packet at this IC and discards the 0-bit. In the fourth address time period, the routing circuit at address 0011 examines the remaining address bit and identifies a 1-bit. Accordingly, it routes the message packet along the output line to IC 0010, discards the final bit of the first copy of the IC address and complements the final bit of the duplicate IC address.

Upon arriving at IC 0010, the routing circuit recognizes the absence of any 1-bit in the duplicate IC address that it tests and accordingly knows that the message packet has reached its destination. The message packet is then delivered to the processor/memory whose address is specified in the message packet. Further details concerning the routing process are set forth below in conjunction with FIGS. 11 through 16.

General Description of a Parallel Processing IC

Each IC 35 is fabricated as a very large scale integrated circuit (VLSI) on a single silicon chip. As shown in FIG. 5, sixty-four ($=2^6$) of these chips are encased in individual chip packages 100 and are mounted on and interconnected through an individual printed circuit (PC) board 130. To provide for 32,768 such ICs, 512 ($=2^9$) printed circuit boards are mounted in a suitable housing. Conventional wiring harnesses 132 interconnect these boards in both the two-dimensional grid and Boolean 15-cube geometries. For the configuration shown in FIG. 5, six of an IC's nearest neighbors will be mounted with it on the same PC board and the other nine will be on different PC boards.

Ninety-seven pins 102 are provided on each package to connect the chip to other chips on the PC board and to the rest of the system. The signals carried by these ninety-seven pins are set forth in Table III.

TABLE III

| Pin Name | No. | Type | Function |
| --- | --- | --- | --- |
| Phi1 | 1 | Input | clock pulse |
| Phi2 | 1 | Input | clock pulse |
| KSYNCH | 1 | Input | Last clock in cycle |
| RESET | 1 | Input | Initialization on power up |
| I0-1 | 2 | Input | ALU operation select |
| I2 | 1 | Input | RegA source invert control, ALU operation select, InvA |
| I3 | 1 | Input | RegB source invert control, InvB |
| I4 | 1 | Input | Flag source invert control, InvF |
| I5-8 | 4 | Input | First register source and destination, Reg A0-3 |
| I9-12 | 4 | Input | Second register source, Reg B0-3 |
| I13-17 | 5 | Input | Register column select, Col 0-31 |
| I18-21 | 4 | Input | Flag addresses, Source and Destination, Flag A0-3 |
| I22-25 | 4 | Input | Flag selection for conditional, Cond 0-3 |
| I26 | 1 | Input | Sense of condition test, 0=skip-on-zero, Not |
| I27 | 1 | Input | Modify RegA with ComIn bits, Mod A |
| CS0-1 | 2 | Input | Chip select, active low |
| N0-7 | 8 | In/Out | Two-dimensional Grid extension to north |
| SW0-7 | 8 | In/Out | Two-dimensional Grid extension to south and west |
| E0-7 | 8 | In/Out | Two-dimensional Grid extension to east (4 pins presently not used are available for future expansion) |
| CubeIn0-14 | 15 | Input | N-cube input from nearest neighbors |
| CubeOut0-14 | 15 | Output | N-cube output to nearest neighbors |
| GLOBAL | 1 | Output | NOR of all Global flags, open drain |
| LED | 1 | Output | Same as Global, open drain driver for LED |
| VSS | 3 | Power | Ground |
| VDD | 2 | Power | +5 volt power |
| VBB | 1 | Power | substrate bias |

The pins named I0-I27, RESET, phi 1, phi 2 and KSYNCH are connected to bus 22 and receive the instruction signals, RESET signal and timing signals, phi 1, phi 2 and KSYNCH from microcontroller 20. The pins CS0 and CS1 are chip select pins that address the chip when the signals at both pins are low. The signals that select these pins are provided to array 30 by bus 24. Pins N0-7, SW0-7, and E0-7 provide connections to the nearest processor/memories on the adjacent chips to the North, South, West and East. Pins CubeIn0-14 and CubeOut0-14 provide connections to the nearest neighbor processor/memories 36 in the Boolean 15-cube. The GLOBAL pin is connected over line 26 to microcontroller 20. The LED pin provides an output that drives a light emitting diode when active, thereby permitting the chip to generate a visual signal. This signal can be used for testing or supervisory purposes and even for display of computational results. The six ground and power supply pins provide ground and power connections to the chip.

Figure 6A:
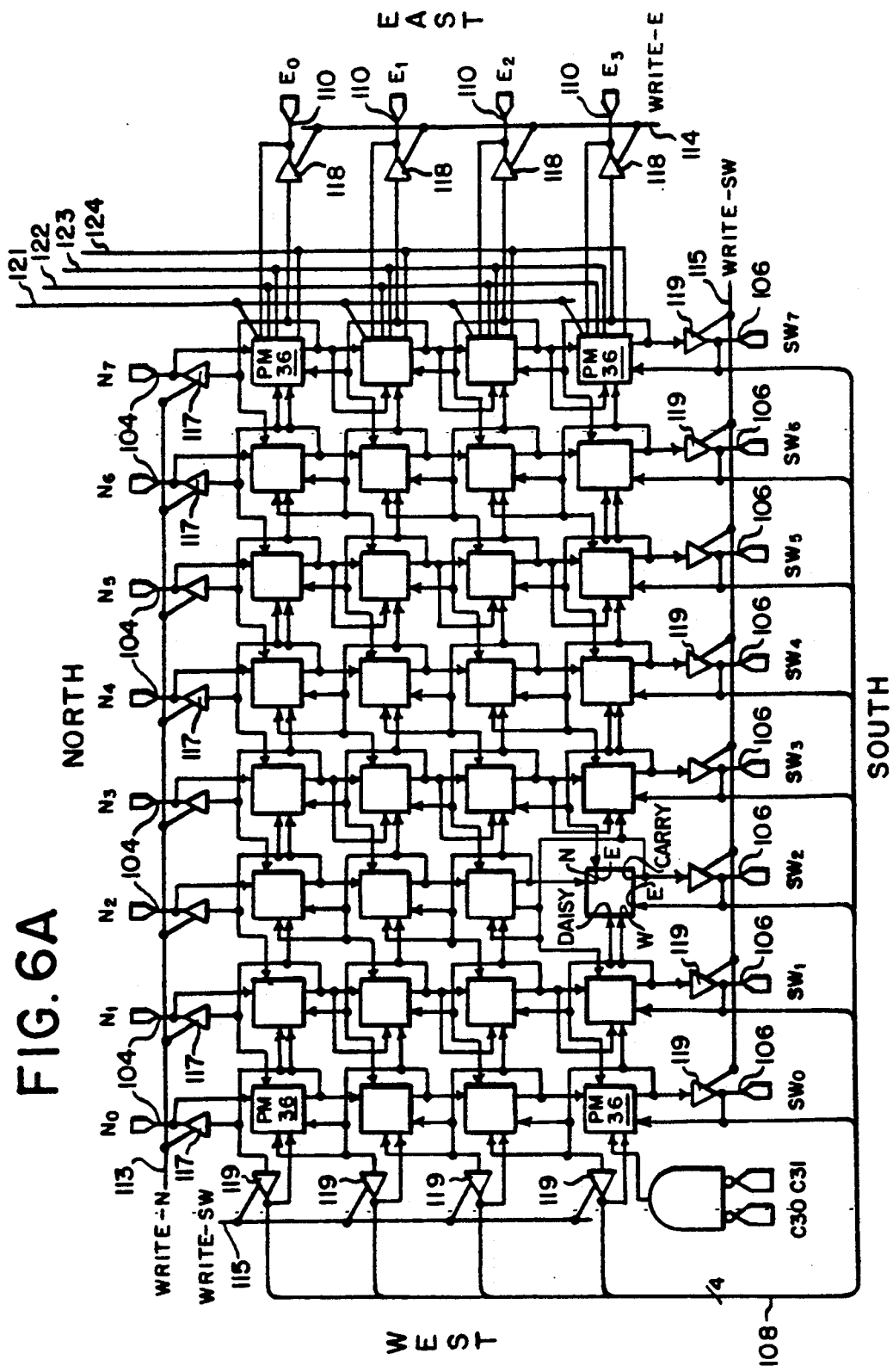
FIGS. 6A and 6B are block diagrams of an illustrative embodiment of one parallel processing IC of the array of FIG. 1.
Figure 6B:
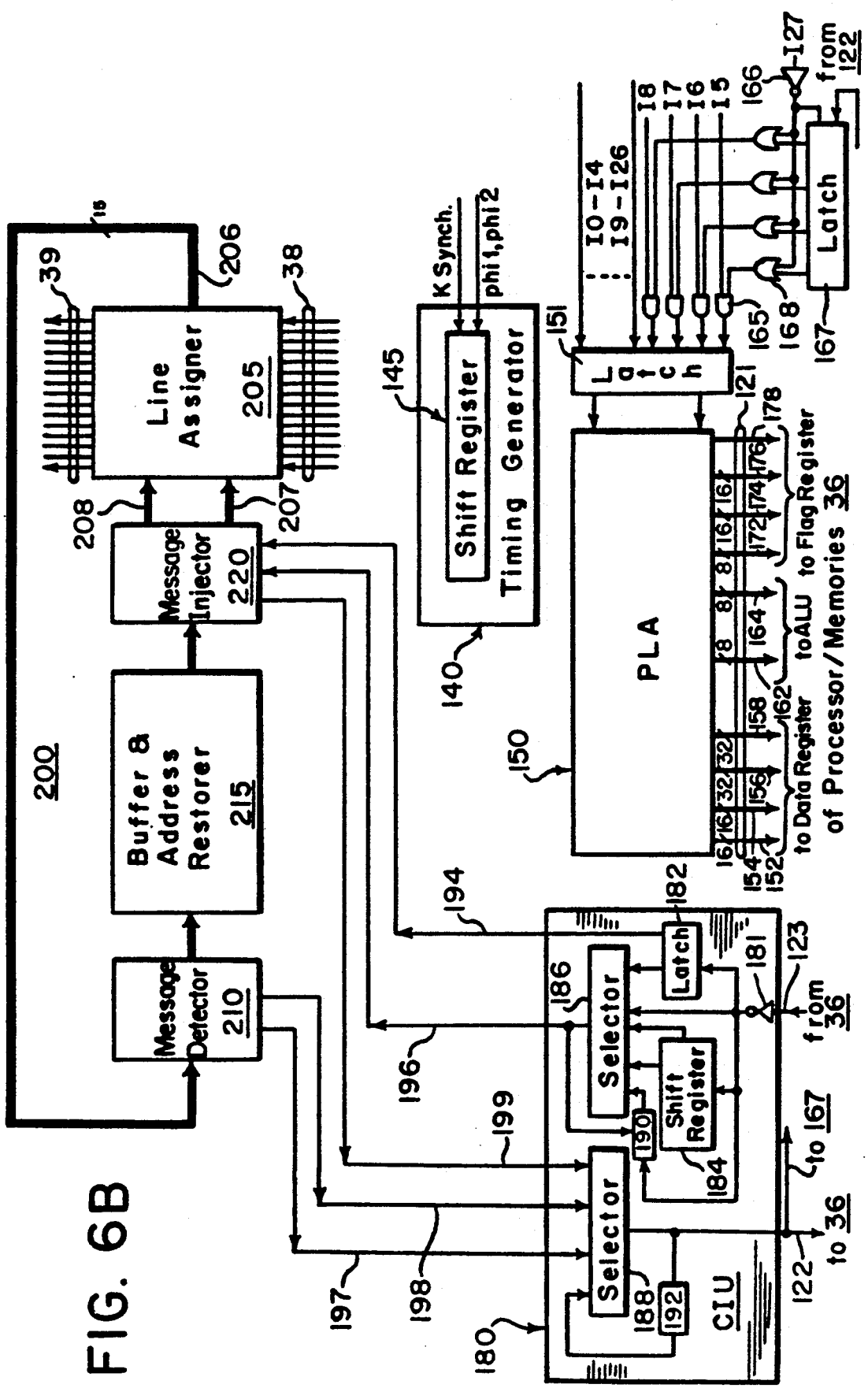
Figure 17:
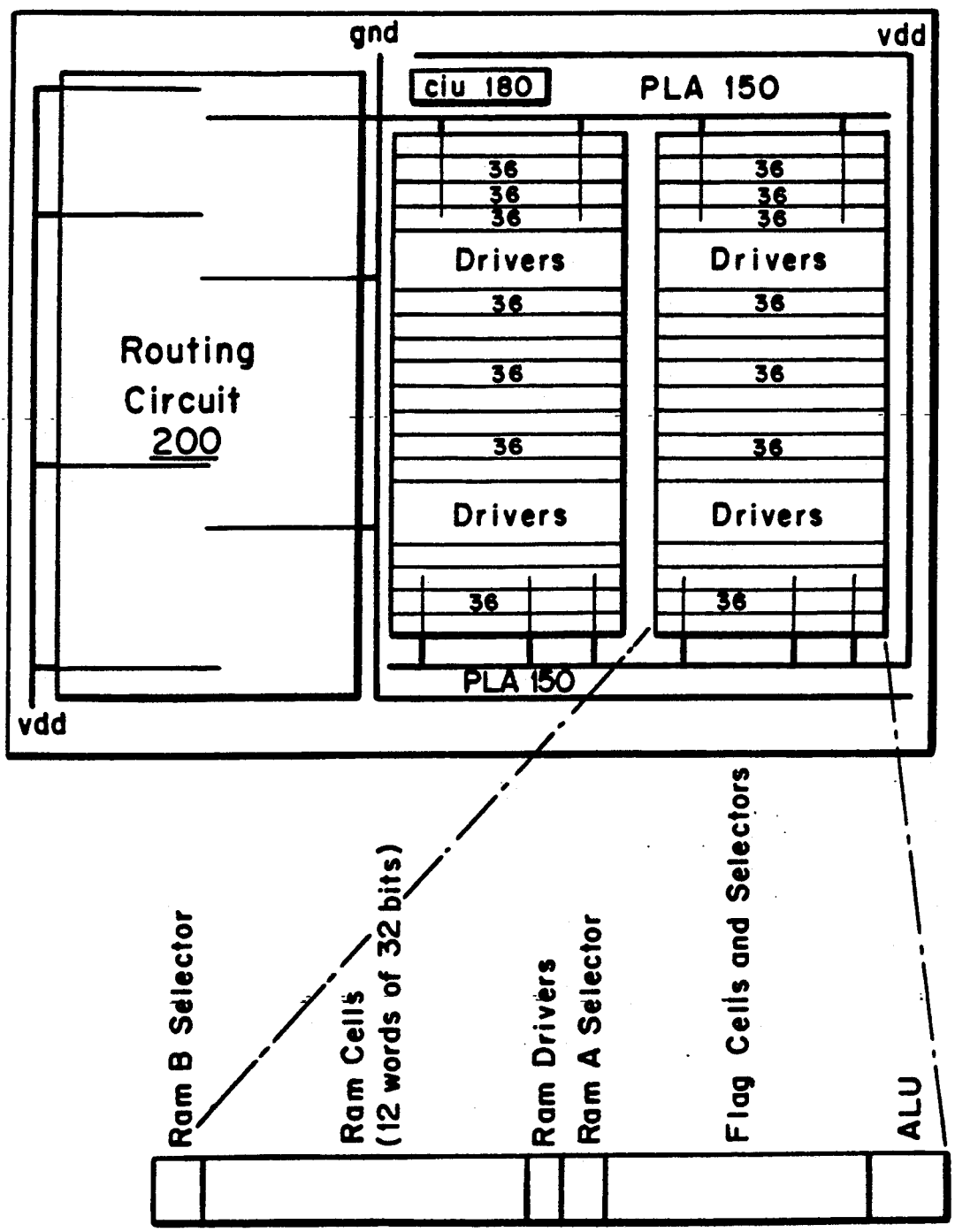
FIG. 17 depicts a VLSI circuit layout for the circuit depicted in FIGS. 6A and 6B.

FIGS. 6A and 6B depict in block diagram form one of the 32,768 identical ICs 35 of array 30. As shown in FIG. 6A, the thirty-two processor/memories 36 of an IC are connected in an array of eight columns and four rows; and, for reference purposes, the edges of this array are identified as North, East, South and West. FIG. 6A does not depict the spatial relationship of the individual processor/memories which as shown in the chip layout of FIG. 17 is different. Returning to FIG. 6A, each processor is connected to its nearest neighbors to the North, East, South and West through input terminals labeled N, E, S and W. Each processor is also daisy-chained together into a line through the input terminal labeled DAISY. The output from each processor to these five input terminals is on the output terminal Carry which is connected to the N, E, S, and W input terminals of the nearest neighbors as well as the DAISY input terminal of the next processor/memory in the chain. As will be apparent, the daisy chain starts in the bottom left-hand corner, goes up the first column, down the second, up the third and so forth to the bottom right-hand corner of the array.

Eight bidirectional lines 104 extend from this processor/memory array to the North to chip pins N0-7 and eight more bidirectional lines 106 extend from the processor array to the South to chip pins SW0-7. Four of these eight lines 106 are multiplexed with four bidirectional lines 108 from the West. Four more bidirectional lines 110 extend from the array to the East to chip pins E0-3. The read-write function of these lines is controlled by write lines 113, 114, 115 which control line drivers 117, 118, 119 respectively, so as to write data to the North, to the East, or to the South/West. Multiplexing of the Southern and Western leads is possible because data flow in the two-dimensional grid array is only in one direction (e.g., East to West) at a time.

In addition to the grid and daisy-chain connections, each processor/memory is also connected in common to an address and output signal bus 121, a message packet input signal line 122, a message packet output signal line 123, and a global output signal line 124. Connections to these lines and bus are shown in FIG. 6A for only the four processor/memories in the Easternmost column; but it will be understood that the same connections are made for all thirty-two processor/memories.

As shown in FIG. 6B, each IC also comprises a timing generator 140, a programmable logic array (PLA) 150, a communication interface unit (CIU) 180, and a routing circuit 200. The timing generator is a shift register 145 through which a pulse is stepped by the system clock signals phi 1 and phi 2. This generator is reset by timing signal, KSYNCH, from microcontroller 20. In accordance with well known technologies, this register produces the timing waveforms of the type shown in FIGS. 9, 10, 14 and 16 which control the operation of the communication interface unit 180 and the routing circuit 200.

Programmable logic array (PLA) 150 is a decoding matrix that receives from microcontroller 20 the instructions on line 22 and decodes these instructions into signals on address and output signal bus 121. The instructions are received at chip package 100 on twenty-eight pins identified in Table III. With the exception of the signals on pins I5-8 and 27, these signals are applied directly to a PLA input latch 151 which stores these signals while they are being decoded by PLA 150 and used by processor/memories 36. The signals on pins I5-8 are applied to four AND gates 165 where they can be modified in accordance with the last four bits of the signal received on message packet input signal line 122 when the signal on pin I27 is high. Pin I27 is connected by an inverter 166 to a serial-input, parallel-output latch 167 which stores these last four bits and to four OR gates 168 that form the logical OR of the inverted signal on pin I27 and the parallel output of latch 167.

As indicated in FIG. 6B, bus 121 comprises two sixteen line busses 152, 154 and two thirty-two line busses 156, 158 which are connected to a RAM register 250 in each processor/memory, two eight line busses 162, 164 that are connected to an ALU 270, and an eight line bus 172, two sixteen line busses 174, 176 and a single line 178 that are connected to a flag controller 290 in each processor/memory. The signals on busses 152, 154, 156, 158, 172, 174 and 176 are decoded address signals that are used to read or write information from or to specific locations in RAM register 250 and flag controller 290. To accomplish such addressing, one line of the bus will carry one binary signal, illustratively a high signal or 1-bit, and all the other lines will carry the other binary signal, illustratively a low signal or 0-bit. The signals on busses 162, 164 to ALU 270 are the different possible outputs of ALU 270. Further details concerning these signals will be supplied below in conjunction with the description of FIGS. 7A and 7B.

Communication interface unit (CIU) 180 controls the flow of outgoing and incoming message packets between the processor/memories of an IC and the routing circuit associated with that IC. CIU 180 comprises an inverter 181, a latch 182, a tapped shift register 184, first and second selectors 186, 188, and first and second parity logic circuits 190, 192. As shown in FIG. 6B, message packet output signal line 123 from processor/memories 36 of the IC is connected by inverter 181 to the inputs to latch 182, shift register 184, selector 186, and parity logic circuit 190. The output of latch 182 is applied on line 194 to routing circuit 200 to indicate when a message packet is available from one of processor/memories 36. The message packet itself is applied to the routing circuit on line 196 from selector 186. In the form in which it is received at CIU 180, an outgoing message packet contains only one copy of the relative IC address of the destination IC. Under control of timing signals from timing generator 140, selector 186 and shift register 184 generate a copy of the relative IC address and insert it at the front end of the message packet. Parity logic circuit 190 computes the correct parity bit for the message packet and provides it to the routing circuit as part of the message packet.

Signals from the routing circuit are applied to selector 188 on lines 197, 198 and 199. These signal lines provide, respectively, an indication whether an incoming message packet is available from the routing circuit, the incoming message packet itself and an indication whether the outgoing message packet on line 196 was successfully received by the routing circuit. The output of selector 188 is the message packet which is applied to processor/memories 36 on message packet input line 122. Parity calculations are preformed by parity logic 192. Further details concerning the operation of these circuits are set forth below in the discussion of FIG. 8.

Routing circuit 200 controls the routing of message packets to and from nearest neighbor ICs in the Boolean n-cube. Circuit 200 comprises a line assigner 205, a message detector 210, a buffer and address restorer 215 and a message injector 220. Line assigner 205 has fifteen input lines 38 from the fifteen nearest neighbors of that particular IC and fifteen output lines 39 to the same fifteen nearest neighbors. Line assigner 205 also has fifteen message output lines 206 to message detector 210 and fifteen message input lines 207 from message injector 220. In addition, for each message input line 207, there is another line 208 that indicates the presence of a message on the associated message input line 207. Line assigner 205 analyzes the addresses of message packets received on incoming lines 38 to determine whether they are directed to this particular IC or some other IC; it routes the message packets toward their destination if possible; and it stores any message packet destined for this IC as well as any message packet that cannot be routed on because of a conflict in circuit allocation.

Message detector 210 checks for the receipt of message packets, examines the address of the message packets received on lines 207 from line assigner 205 and supplies those message packets addressed to this IC to CIU 180 on line 198. In the circuit shown in FIG. 6B, line 198 can transmit only one message packet at a time. In the event more than one message packet is addressed to this IC, one packet is provided to CIU 180 and the others are provided to buffer 215 along with all other messages packets that are addressed to different ICs.

Buffer and address restorer 215 comprises a tapped shift register similar in construction and function to tapped shift register 184. Buffer 215 regenerates at the beginning of the message packet a copy of the address of the message packet from the duplicate address information present in the message packet. The output of the buffer and address restorer is applied to the message injector 220.

Message injector 220 injects a single message packet at a time from CIU 180 into the group of message packets circulating through the routing circuit. Further details concerning the routing circuit are set forth in conjunction with FIGS. 11 through 16.

A chip layout for IC 35 is depicted in FIG. 17. In this layout, PLA 150 is implemented in two arrays located along the upper and lower edges of the chip on the right-hand side. The individual processor/memories 35 are formed in groups of four in the space between PLA 150 with bus drivers interspersed between them. As will be apparent from the discussion below of an individual processor/memory, each processor/memory includes 384 bits of dynamic read-write storage, addressing circuitry to such storage, an ALU, a flag register, addressing circuitry for the flag register and various driver circuits. CIU 180 is located near the top center of the chip; and timing generator 140 and routing circuit 200 take up the left-hand portion of the chip. For this arrangement, address and output signal bus 121 from PLA 150 to the individual processor/memories 36 is an array of vertical lines passing through the individual processor/memories and bus drivers; and output lines from the processor/memories to CIU 180 are likewise essentially an array of vertical lines. As shown in the exploded view of one processor/memory, the signal flow in the processor/memory is essentially at right angles to bus 121. As a result, line crossings are minimized and circuit layout is simplified.

The approximate number of transistors required to implement one processor/memory 36 in a VLSI design is 1800; and the number of transistors in PLA 150, the thirty-two processor/memories and the bus drivers is about 60,000. The timing generator, routing circuitry and CIU require approximately 24,000 transistors. Fabrication of an integrated circuit of less than 100,000 transistors on a single silicon chip is well within current skill in the art; and the commercial production of integrated circuit 35 on a single silicon chip approximately 7 mm. by 8 mm. appears feasible with present-day technology.

Description of Processor/Memory

Figure 7A:
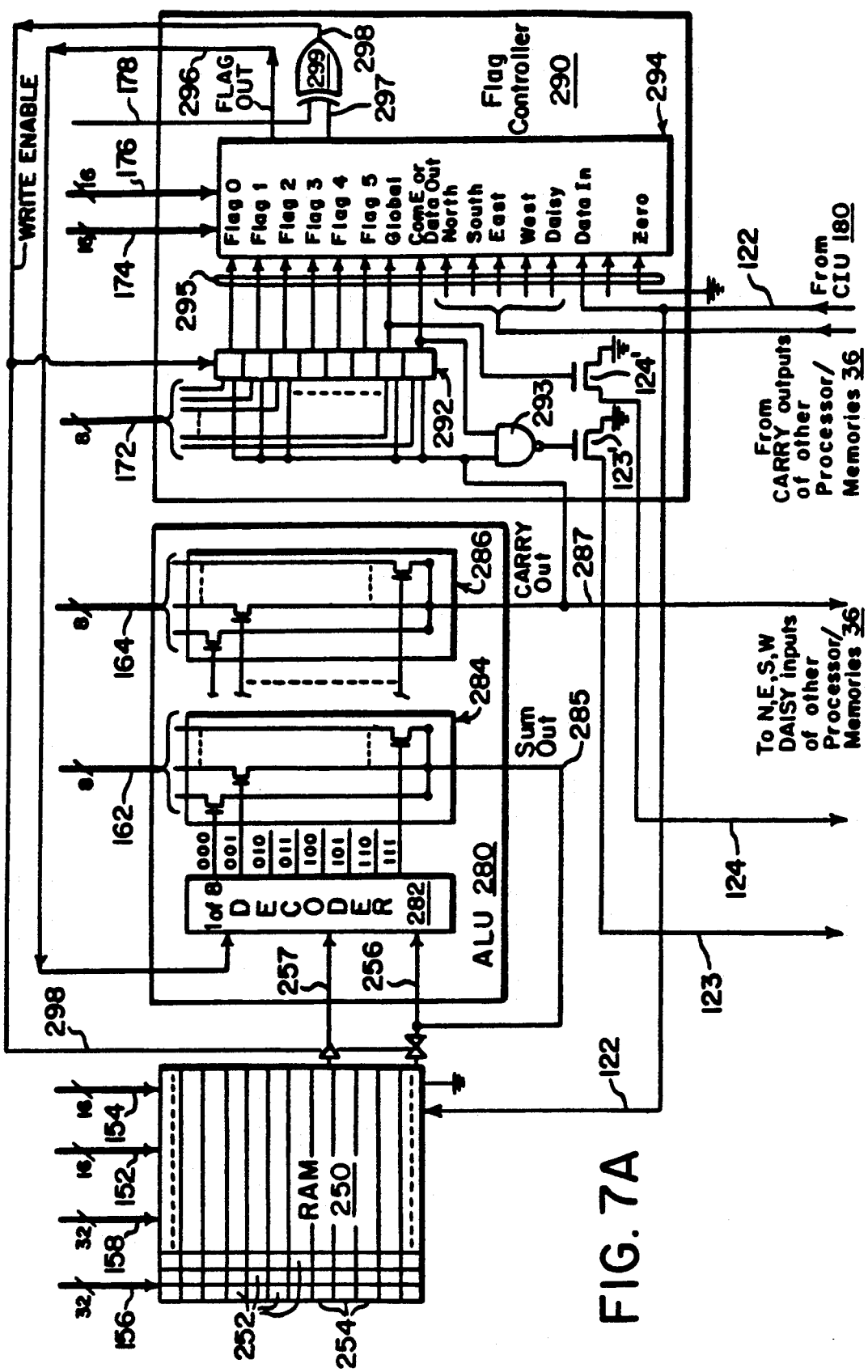

One processor/memory 36 is disclosed in greater detail in FIGS. 7A and 7B. As shown in FIG. 7A, the processor/memory comprises random access memory (RAM) 250, arithmetic logic unit (ALU) 280 and flag controller 290. The ALU operates on data from three sources, two registers in the RAM and one flag input, and produces two outputs, a sum output that is written into one of the RAM registers and a carry output that is made available to certain registers in the flag controller as well as to certain other processor/memories. ALU operations take place in two cycles, a read cycle and a conditional write cycle. During the read cycle, the bits to be operated on are fetched from the two RAM registers and the flag input; and the sum and carry outputs are determined. During the write cycle, these results are written into the RAM and flag register if the specified condition is satisfied. The timing of the ALU is such that the newly computed values of the sum and carry outputs are available before the write cycle. This permits the sum output signal to be written back into one of the RAM registers during the write cycle and allows the carry output to propagate through multiple processor/memories on the same chip during a single instruction cycle.

RAM 250

RAM 250 comprises an array of dynamic read/write memory ICs 252 that are arranged in the form of twelve registers 254 of thirty-two bits each. Each of the thirty-two bits is separately addressable at columns 0 through 31. The registers are numbered 0 through 15 and address lines are provided to access up to 16 registers. However, registers 12 and 13 are not used and registers 14 and 15 provide signals that are not stored in RAM 250. Registers 0 through 11 are general purpose registers. Registers 14 and 15 have special functions. All bit positions of Register 14 will have the same value as that of the bit then on line 122; and all bit positions of Register 15 are zero. Thus Register 15 acts as a data sink.

The inputs to RAM 250 are busses 152, 154, 156, 158, a sum output line 285 from ALU 270, the message packet input line 122 from CIU 180 and a WRITE ENABLE line 298 from flag controller 290. The outputs from RAM 250 are lines 256, 257. The signals on lines 256, 257 are obtained from the same column of two different registers in RAM 250, one of which is designated Register A and the other Register B. Busses 152, 154, 156, 158 address these registers and the columns therein in accordance with the instruction words from microcontroller 20. Illustratively, with reference to Table III, lines I 5–8 are decoded by PLA 150 to provide a high signal on one of sixteen lines 152 of bus 121 that selects or addresses Register A, lines I 9–12 are decoded to supply a high signal on one of sixteen lines 154 that selects Register B, and lines I 13–17 are decoded to supply a high signal either on one of thirty-two write lines 156 or on one of thirty-two read lines 158 each of which selects one of the thirty-two columns in random access memory 250. Thus, lines 152–158 specify two cells in the 12×32 bit RAM and whether the operation is a read or a write.

Further details of RAM 250 are shown in FIG. 7B which illustrates the four cells in the upper left-hand corner of RAM 250 and associated circuitry. Each cell 252 comprises three pass transistors 261, 262, 263 connected as shown so as to store one bit of information in transistor 263. A bit of data is read from a transistor 263 under control of the signal on one of read select lines 158 and one of pass transistors 262.

Each register 254 of thirty-two cells 252 also comprises a bit line 255, a refresh circuit 264 and a precharge transistor 271. The refresh circuit comprises three pass transistors 265, 266, 267 connected as shown so as to store one bit of information in transistor 266. A bit of data is written into a transistor 266 under control of the signal on a shared read line 268 and one of pass transistors 265. The bit of data stored in pass transistor 266 is read out under control of the signal on a refresh/write line 269 and pass transistor 267.

Each of bit lines 255 is connected to a pass transistor 273 and a pass transistor 274. In addition, line 122 is connected to a pair of pass transistors 273, 274 to provide the register 14 input; and a ground connection is provided to another pair of pass transistors 273, 274 to provide a source of 0-bits and a data sink as register 15. The sixteen pass transistors 273 constitute a Register A selector 275 with each pass transistor functioning as an AND gate that is enabled by a different one of the sixteen lines 152 so as to select Register A from one of as many as sixteen registers in RAM 250. Likewise, the sixteen pass transistors 274 constitute a Register B selector 276 with each transistor connected to a different one of the sixteen lines 154 that select Register B from these sixteen registers. At any time only one of pass transistors 273 and only one of pass transistors 274 will be conducting so as to select an output for Register A and Register B.

The outputs of transistors 273 are connected together to provide the Register A signal on line 256; and the outputs of transistors 272 are connected together to provide the Register B signal on line 257. The signal on line 256 is provided by a bidirectional driver 258 to one input to ALU 280; and the signal on line 257 is provided by a driver 259 to another input to ALU 280.

During the write cycle of the ALU, the sum output signal is written back into Register A. Advantageously, this signal is provided to transistor 266 of Register A through bidirectional driver 258, line 256 and the one pass transistor 273 that is conducting a signal.

Ram 250 operates on a four phase clock signal, two of which signals are the basic clock signals phi 1 and phi 2 and the others of which, phi 1p and phi 2p, are pre-cursors to phi 1 and phi 2. The clock signals phi 1p and phi 2p are both applied to a pre-charge line 272 so as to pre-charge bit lines 255 before each read operation during clock cycle phi 1 and each write operation during clock cycle phi 2. During clock cycles phi 1p and phi 2p, the signal on pre-charge line 272 is high, thereby making pre-charge transistors 271 conductive and establishing a connection between positive voltage supply $V_{DD}$ and each bit line. During clock cycle phi 1p, this connection charges each bit line 255 to a high signal or 1-bit.

During clock cycle phi 1, the signal stored in pass transistor 263 during the previous write cycle is read out in inverted form onto bit line 255 of each register of RAM 250. If the signal stored was a high signal or 1-bit, pass transistor 263 is conductive providing a path to ground. As a result, when a high signal is applied on a read select line 158 to pass transistor 262, a path to ground is established that forces bit line 255 to low. Therefore, the 1-bit written on transistor 263 during the previous, write cycle is transformed into a 0-bit. Alternatively, if a 0-bit had been written on transistor 263, there would be no ground path and bit line 255 would remain high. As a result, the bit written on transistor 263 would again be inverted, in this case to a 1-bit. The inverted bit is reinverted during the next clock cycle, the refresh cycle.

During clock cycle phi 1, the signal on read line 268 is also high making each transistor 265 conductive. As a result, the signal on each bit line 255 is written on transistor 266 in refresh circuit 264. At the same time, the signal on the bit line selected by the transistors 273 of the Register A selector and the signal on the bit line selected by the transistors 274 of the Register B selector are provided to drivers 258, 259. If these drivers are enabled by the WRITE ENABLE signal on line 298, the Register A and Register B signals are provided to ALU 280 on output lines 256 and 257, respectively.

During clock cycle phi 2p, the signal on pre-charge line 272 and refresh/write line 269 are high, making each transistor 267 and 271 conductive. If a 1-bit had been written on transistor 266 during clock cycle phi 1, that transistor would also be conductive, thereby establishing a path to ground that pulls bit line 255 low. As a result, the 1-bit written on transistor 266 during clock cycle phi 1 is transformed into a 0-bit.

Alternatively, if a 0-bit had been written on transistor 266, there is no conductive path to ground in refresh circuit 264; and bit line 255 is pulled high by pre-charge transistor 271 which provides a conductive path between positive voltage supply $V_{DD}$ and bit line 255. As a result, the 0-bit written on transistor 266 is inverted to a 1-bit.

During clock cycle phi 2, the signal on each bit line is written on each transistor 263 of the cells in the column selected by one of write select lines 156. In particular, when a high signal is applied on one of write select lines 156, each transistor 261 to which it is applied becomes conductive, thereby providing a path between each one of bit lines 255 and one of transistors 263 so that the signal on each bit line is written on transistor 263. Because this signal was inverted once when it was read out of transistor 263 during clock cycle phi 1 and once when it was read out of transistor 266 during clock cycle phi 2p, the signal written back into transistor 263 is the same as the signal originally read out and the transistor has been refreshed.

However, in the case of the bit line 255 that provides the Register A output, the signal that is written in transistor 163 during clock cycle phi 2 is the sum output of ALU 280 and not the signal originally read from transistor 263. The sum output signal is made available to bidirectional driver 258 on line 285 during clock cycle phi 2p. If this signal is low, driver 258 provides a path to ground that writes a 0-bit on transistor 266 in Register A regardless of the state of the signal stored on transistor 266 during clock cycle phi 1. Likewise, if the sum output signal is high, driver 258 provides a path to positive voltage supply $V_{DD}$ that writes a 1-bit on transistor 266 regardless of the signal stored on transistor 266 during clock cycle phi 2p. Again, a 1-bit on transistor 266 pulls bit line 255 low and a -0-bit allows line 255 to be pulled high. As a result, during clock cycle phi 2, the state of bit line 255 of Register A is the inverse of the sum output signal; and this is the signal that is written on transistor 263 of the cell of that register.

Flag controller 290

As shown in FIG. 7A, flag controller 290 is an array of eight one-bit D-type flip-flops 292, a two-out-of-sixteen selector 294 and some logic gates. The inputs to flip-flops 292 are a carry output signal from ALU 280, a WRITE ENABLE signal on line 298 from selector 294, and the eight lines of bus 172 from PLA 160. Lines 172 are address lines each of which is connected to a different one of flip-flops 292 to select the one flip-flop into which a flag bit is to be written. Illustratively, the flip-flop is selected by a high signal on the line connected to that flip-flop while a low signal is provided on the other seven lines connected to the other seven flip-flops. The outputs of flip-flops 292 are applied to selector 294. The output of one of these flip-flops, the Global flip-flop, is also applied by a pass transistor 124' to global output signal line 124; and the output of another flip-flop, the ComE flip-flop, is applied to a NAND gate 293 whose output is provide by a pass transistor 123' to message packet output signal line 123.

The inputs to selector 294 are up to a sixteen flag signal lines 295, eight of which are from flip-flops 292, and the sixteen lines each of busses 174, 176. Again, lines 174 and 176 are address lines which select one of the flag signal lines for output or further processing. Selector 294 provides outputs on lines 296 and 297 that are whichever flags have been selected by address lines 174 and 176, respectively. The flag on line 296 is the FLAG OUT signal. The flag on line 297 is compared by an exclusive OR gate 299 with the signal on line 178 from PLA to produce a WRITE ENABLE signal on line 298.

Selector 294 can be implemented by two arrays of sixteen pass transistors each, similar to arrays 275, 276 in RAM 250. Each of the sixteen lines 174 controls one pass transistor of the first array and each of the sixteen lines 176 controls one pass transistor of the second array. Each of the pass transistors constitutes an AND gate that is enabled by the appropriate signal on lines 174, 176. Individual flag inputs are applied to two different pass transistors, one in each array. The FLAG OUT signal on line 196 is simply the logical OR of the output of the sixteen pass transistors of the first array. The WRITE ENABLE signal on line 198 is obtained by comparing the logical OR of the output of the sixteen pass transistors of the second array with the signal on line 178.

The names, addresses and functions of the flags are set forth in Table IV:

TABLE IV

| Address | Name | Function |
|---|---|---|
| 0 | Flag0 | General purpose flag |
| 1 | Flag1 | General purpose flag |
| 2 | Flag2 | General purpose flag |
| 3 | Flag3 | General purpose flag |
| 4 | Flag4 | General purpose flag |
| 5 | Flag5 | General purpose flag |
| 6 | Global | General purpose flag, holds down GLOBAL bus 135 |
| 7 | ComE | General purpose flag, enables Carry onto message data output signal line 134 |
| 8 | North | Grid connection, reads Carry of chip to North |
| 9 | South | Grid connection, reads Carry of chip to South |
| 10 | East | Grid connection, reads Carry of chip to East |
| 11 | West | Grid connection, reads Carry of chip to West |
| 12 | Daisy | Chain connection, reads Carry of next chip in daisy chain |
| 13 | DataIn | Reads data in from message data input signal line 122 |
| 14 | | Reserved |
| 15 | Zero | Always reads zero |

The eight flag registers 292 (addresses 0–7) may be written with data from the carry output line of ALU 280. These values may be used for internal operations of the processor/memory. The flags Global and ComE have special functions. The outputs of the Global flags from all the processor/memories 36 on a chip are inverted and ORed together and applied on bus 124 to the Global pin (See Table III) on the chip. The outputs of all the GLOBAL pins in the array of 32,768 chips are ORed together and applied on line 26 to microcontroller 20. The ComE flag provides the carry output of ALU 280 to message packet output signal line 123 to CIU 180. If several process/memories on a chip simultaneously provide outputs to line 123, the output of CIU 180 on line 196 to routing circuit 200 will be the logical OR of the carry outputs of all the processor/memories that are then providing outputs to line 123.

The North, East, South and West flags are the inputs to the processor/memory from the carry output lines of the nearest neighbor processor/memories to the North, East, South and West. Similarly, the DAISY flag is the input from the carry output line of the processor/memory that is next in line in the daisy chain. Messages from the communication interface unit (CIU) 180 are supplied to flag controller 290 as well as to an input to RAM 250 by message packet input signal line 122. Messages from the processor/memory are supplied to CIU 180 on message packet output signal line 123. The Zero flag will always provide a zero output.

As indicated, processor operations include a read cycle and a write cycle. During a read cycle, the signals on pins I 18–21 of the chip specify the address of the flag that is to be read. These signals are decoded by PLA 160 and applied to selector 294 on sixteen line bus 174. During a write cycle, the signals on pins I 18–21 of the chip specify the address of the flag register 292 into which the carry output is to be read. The signals on pins I 18 14 21 may change between a read and a write cycle so that the source and destination flag may be different.

Because all the processor/memories on a chip are connected in parallel to address and output signal bus 121, all the processor/memories receive the same instruction from pins I 0–27. However, execution of each instruction is conditionalized on the state of one of the flags of controller 290. The signals on pins I 22–25 of the chip specify the address of the flag on which execution is conditionalized and the signal on pin I 26 specifies whether the test is for a zero or a one. These address signals are decoded by PLA 150 and applied to two-out-of-sixteen selector 294 on sixteen-line bus 176. The signal on pin I 26 is applied to XOR gate 299 on line 178. XOR gate 299 compares the signal on line 178 with the flag at the address specified by the signal on one of the sixteen lines of bus 176. If the two signals are the same, then a WRITE ENABLE signal is generated on line 298 during the write cycle that permits the sum and carry outputs determined during the read cycle to be written into RAM register A and the flag register 292 specified by the signals on bus 172.

ALU 280

ALU 280 comprises a one-out-of-eight decoder 282, a sum output selector 284 and a carry output selector 286.

ALU 280 operates on three bits at a time, two on lines 256, 257 from Registers A and B in RAM 250 and one on line 296 from flag controller 290. The ALU has two outputs: a sum on line 285 that is written into Register A of RAM 250 and a carry on line 287 that may be written into a flag register 292 and applied to the North, East, South, West and DAISY inputs of the other processor/memories 36 to which this processor/memory is connected. The signal on pins I5–8 which address Register A may change between a read and a write so that the Register A specified during a read cycle may be different from that specified during a write cycle.

The ALU can produce the sum and carry outputs of thirty-two functions that are all variations of the five basic operations ADD, OR, AND, MOVE and SWAP. The particular function is selected by the signals on pins I0, I1 and I2 (Table III). The basic operations are modified by selectively complementing any of the three inputs to the ALU by setting the appropriate bit in the instruction word. These bits are applied to the chip on pins I2–I4. A summary of the basic operations, the chip inputs and the sum and carry outputs is set forth in Table V.

TABLE V

| I0 | I1 | I2 | Name | Sum-Output | Carry-output |
|---|---|---|---|---|---|
| 0 | 0 | x | Add | A+B+F | AF∨BF∨AB |
| 1 | 0 | x | And | ABF | ABF |
| 0 | 1 | x | Or | A∨B∨F | A∨B∨F |
| 1 | 1 | 0 | Move | B | (A+B)∨F |
| 1 | 1 | 1 | Swap | F | B | where A, B and F are the outputs from Register A, Register B and the flag controller, ∨ represents an inclusive OR operation, + represents an exclusive OR operation and the absence of a symbol between a pair of outputs represents an AND operation. As indicated in the above table, the I2 bit is used to distinguish between the MOVE and SWAP operations. The sum output of the MOVE function and both outputs of the SWAP function are independent of the A input, with the result that an inversion of the input from Register A is meaningless for these operations. For the CARRY output of the MOVE function, the contents of Register A are not inverted.

To provide this capability in thirty-two processor/memories on a single chip, PLA 180 is programmed so that it generates sum and carry output tables for each of the different instructions on pins I0 through I4 for every possible combination of inputs to the ALU. The ALU simply selects the appropriate sum output and carry output for the actual combination of inputs applied to the ALU. Because there are only three inputs to ALU 280, there are only eight possible combinations of the signals on these inputs: 000, 001, 010, 011, 100, 101, 110, 111. For each of these eight combinations, PLA 180 generates a sum output and a carry output as specified by the equations in Table V. Accordingly, for each of the thirty-two functions specified by an instruction on pins I0-I4, PLA 180 generates possible sum output signals on eight lines of bus 164 and possible carry output signals on eight lines of bus 166. These two sets of signals are applied respectively to sum output selector 284 and carry output selector 286 of each ALU on the chip.

As shown in FIG. 7A, each of these selectors is an array of pass transistors, each of which constitutes an AND gate that is enabled by the appropriate signal on an output of decoder 282. Each of these outputs corresponds to one of the eight possible combinations of signals received at its input as indicated by the three digit number adjacent the output line. Hence, the sum output on line 285 and the carry output on line 287 are the two signals, one on one of lines 162 and the other on one of lines 164, that are the outputs defined by the equations of Table V for the particular combination of inputs to decoder 272.

Consider, for example, the AND function. As specified by Table V, the sum output and the carry output for this function is a 0-bit when at least one input to decoder 282 is a 0-bit and the outputs are 1-bits only when all inputs to decoder 282 are 1-bits. Because only one of the eight possible combinations of inputs to decoder 282 is all 1-bits, only one of the eight lines 162 and only one of the eight lines 164 from PLA 180 to ALU 280 provides a 1-bit when the AND function is specified by a 1-bit on pin I0 and a 0-bit on pin I1. Accordingly, the signals passed by the gates in selectors 284 and 286 are 0-bits except when all the inputs to decoder 282 are 1-bits.

A complete table of the output signals on lines 162 and 164 for the thirty-two functions specified on pins I0-I4 is set forth in Table VI:

TABLE VI

| Decoder Inputs: | A | 01010101 | 01010101 |
|---|---|---|---|
| | B | 00110011 | 00110011 |
| | F | 00001111 | 00001111 |
| Function | Pin Input | Sum Output | Carry Output |
| ADD | 00000 | 01101001 | 00010111 |
| | 00001 | 10010110 | 01110001 |
| | 00010 | 10010110 | 01001101 |
| | 00011 | 01101001 | 11010100 |
| | 00100 | 10010110 | 00101011 |
| | 00101 | 01101001 | 10110010 |
| | 00110 | 01101001 | 10001110 |
| | 00111 | 10010110 | 11101000 |
| AND | 10000 | 00000001 | 00000001 |
| | 10001 | 00010000 | 00010000 |
| | 10010 | 00000100 | 00000100 |
| | 10011 | 01000000 | 01000000 |
| | 10100 | 00000010 | 00000010 |
| | 10101 | 00100000 | 00100000 |
| | 10110 | 00001000 | 00001000 |
| | 10111 | 10000000 | 10000000 |
| OR | 01000 | 01111111 | 01111111 |

TABLE VI-continued

| | 01001 | 11110111 | 11110111 |
|---|---|---|---|
| | 01010 | 11011111 | 11011111 |
| | 01011 | 11111101 | 11111101 |
| | 01100 | 10111111 | 10111111 |
| | 01101 | 11111011 | 11111011 |
| | 01110 | 11101111 | 11101111 |
| | 01111 | 11111110 | 11111110 |
| MOVE | 11000 | 00110011 | 01101111 |
| | 11001 | 00110011 | 11110110 |
| | 11010 | 11001100 | 10011111 |
| | 11011 | 11001100 | 11111001 |
| SWAP | 11100 | 00001111 | 00110011 |
| | 11101 | 11110000 | 00110011 |
| | 11110 | 00001111 | 11001100 |
| | 11111 | 11110000 | 11001100 |

For these thirty-two functions, and sources of zeroes in both RAM Register 15 and the flag controller, it is possible to perform all of the following operations:

the addition or subtraction of aligned fields;
the addition or subtraction Of a constant;
the calculation of any Boolean (or logic) function of two registers with outputs to a flag register and/or to Register A;
the calculation of any Boolean function of Register A and a flag with outputs to a flag register and/or Register A;
moves from one RAM register to another, from a register to a flag register or from a flag register to a RAM register;
the shifting or permutation of a register;
the comparison of aligned fields to determine if one is equal to, greater than, or less than the other;
the comparison of a field with a constant to determine whether one is equal to, greater than or less than another; and
the comparison of a field with a constant for equality two bits at a time.

For example, to add the contents of Registers A and B, the ADD instruction 00000 is applied thirty-two times to the pins I0-I4 of chip package 100 along with the signals on pins I5-I8 and I9-I12 that identify registers A and B and the signals on pins I13-I17 that identify the column in the registers on which the ADD instruction is to be performed. Moreover, signals on pins I18-I21 identify the flag that constitutes the third input to each ADD operation as well as the flag register to which the carry output is written. The signals on pins I22-I25 specify a flag on which the writing step is to be conditioned and the signal on pin I26 specifies the condition of the test. Throughout the execution of the thirty-two instructions the signals on pins I0 through I12 remain the same because the ADD instruction and the identity of registers A and B remain constant. The column numbers represented by the signals on pins I13-I17 are incremented by one with each execution of the ADD instruction so as to access a different pair of bits in registers A and B. For the first execution of the ADD instruction the signals on pins I18-I21 during the read cycle will be 1111 to address the zero flag and thereby initialize the carry input with a zero. For the first write cycle and for the read and write cycles of the remaining thirty-one executions of the ADD operation, the signals on pins I18-I21 will address one of flag registers 292 so that the carry output may be stored therein and read therefrom. The sum output on line 285 will be written back into register A.

Subtraction may be performed by the ADD instruction with complementation of the register input that is the subtrahend. Multiplication and division may be performed using various addition and subtraction algorithms.

Boolean functions are performed in like fashion, one column at a time. In the case of the AND and OR functions, the results are provided to register A via the sum output and the results may also be provided to a flag register via the carry output. The exclusive OR (XOR) function is provided by the carry output of the MOVE function where the flag is used to record whether any pair of A and B inputs is not the same. NAND and NOR functions are provided in accordance with well known logic equations from the OR function and the AND function, respectively, when all inputs are complemented.

Register transfer operations are likewise performed one column at a time using the MOVE function to transfer the contents of the register designated register B to the register designated register A.

Data shifting operations are performed using the SWAP function and a flag register. Each bit of the data to be shifted is first read out of its column in the RAM register designated Register B and is stored in a designated flag register. On the next execution of the SWAP instruction, the data bit in the flag register is written into the next adjacent column in the RAM register A and the data bit in that column in the RAM register B is written into the flag register. The direction of shifting depends simply on whether the data in the RAM register B is addressed from the least significant bit to most significant bit or vice versa.

The SWAP function also permits data to be passed from one processor to another by providing data from Register B to the carry output line and by writing data from any of the North, East, South, West or Daisy inputs into Register B.

Algorithms for the implementation of compare operations will be apparent to those skilled in the art from the foregoing description. For example, differences between two bits can be identified by summing them and ignoring any carry. If such a sum is a 0-bit, there is no difference. If it is a 1-bit, there is a difference.

The carry output resulting from execution of each of the different instructions by a processor/memory is available on line 287 to the North, East, South and West inputs of nearest neighbor processor/memories 36 on the chip. It is also available to the Daisy input of the next processor/memory in the daisy chain. Through these inputs to adjacent processor/memories the carry outputs may also be made available to other more distant processor/memories on the chip.

When NAND gate 293 is enabled, the carry output is also made available to message packet output signal line 123 to Communications Interface Unit 180 and routing circuit 200. By this means the carry output may be delivered in a message packet to any other processor/memory 36 in array 30.

From the foregoing description of PLA 160, RAM 250, ALU 280 and flag controller 290, it will be possible to devise all manner of computer programs that make use of the parallel processing capabilities of the computer system described herein. These processing operations will ordinarily be performed in processing cycles that have a duration of basic clock cycles phi 1 that is chosen to suit the data being processed. To improve the interaction between the different processor/memories 36 of array 30, the individual processor/memories may also communicate with each other through routing circuit 200. Before discussing an example of such routing, an understanding of the operation of CIU 180 and routing circuit 200 is desirable.

Description of Communication Interface Unit

Figure 8:
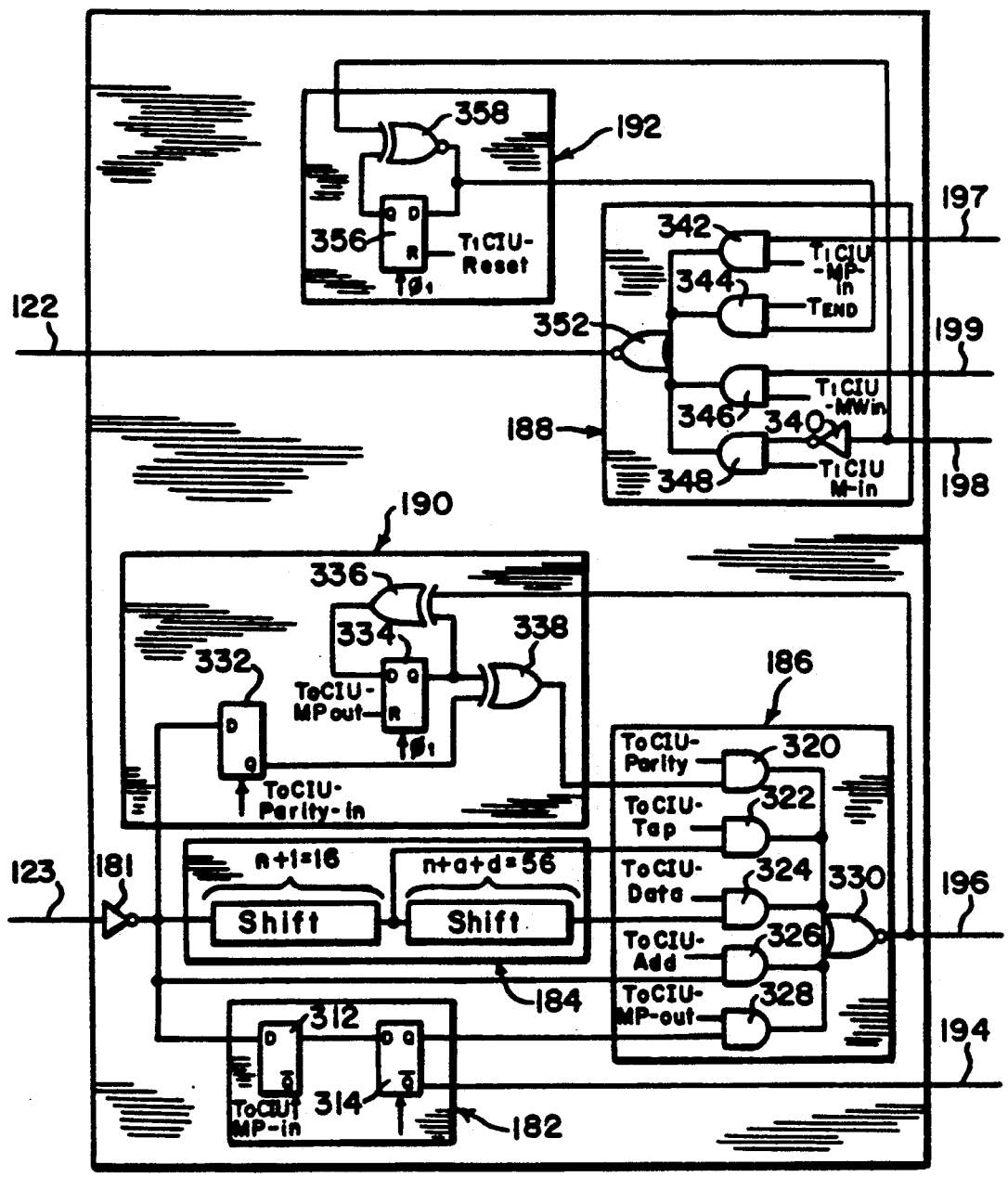
FIG. 8 is a logic diagram of an interface unit depicted in the block diagram of FIG. 6B.

As shown in FIGS. 6B and 8, CIU 180 comprises inverter 181, latch 182, tapped shift register 184, first and second selectors 186, 188, and first and second parity logic circuits 190, 192, each of these elements being identified by the same numbers in each Figure. As shown in FIG. 8, latch 182 comprises first and second D-type flip-flops 312, 314; shift register 184 is a seventy-three bit shift register with an input terminal, an output terminal and an output tap between the sixteenth and seventeenth shift positions following the input terminal; first selector 186 comprises five AND gates 320, 322, 324, 326, 328 and NOR gate 330; and first parity logic 190 comprises first and second D-type flip-flops 332, 334 and first and second NOR gates 336, 338. These elements receive the bits of a message packet on line 123 from a processor/memory on the chip and transmit them to routing circuit 200 after certain timing and data processing operations described below. Second Selector 188 comprises an inverter 340, four AND gates 342, 344, 346, 348 and a NOR gate 352; and second parity logic comprises a D-type flip-flop 356 and a NOR gate 358. These elements receive the bits of a message packet from routing circuit 200 and transmit them to one of the processor/memories on the chip after certain timing and data processing operations likewise described below.

When a message packet is to be transmitted to routing circuit 200, CIU 180 expects to receive at the input to inverter 181 the following information from the processor/memory at the indicated point in the routing cycle:

| Clock Cycle | Information |
|---|---|
| 53 | Parity bit for the absolute address of the IC from which the message packet is being sent. |
| 54 | A 1-bit, if message packet is to be transmitted on next cycle. |
| 55-86 | Data of the message packet to be transmitted on next cycle. |
| 87 | Parity bit for the message packet |
| 0-14 | IC address to which message packet is to be transmitted. |
| 15-19 | Address of processor/memory in IC to which message packet is to be transmitted. |
| 20-23 | Address of register in processor/memory of IC to which message packet is to be transmitted. |

All these signals are applied to shift register 184 and shifted through the register to selector 186. However, certain of these signals are also applied to latch 182, selector 186 and parity logic 190.

Routing circuit 200 expects to receive a low signal on line 194 commencing with the first clock cycle of the routing cycle in which the message packet is to be sent. Routing circuit 200 also expects to receive the following information on line 196 at the basic clock cycle indicated:

| Clock Cycle | Information |
|---|---|
| 0-14 | IC address to which message packet is to be transmitted if there is a message packet. |
| 15 | A 1-bit, if there is a message packet to be transmitted. |
| 16-30 | Duplicate of IC address to which message packet is to be transmitted. |
| 31-35 | Address of processor/memory in IC to which message packet is to be transmitted. |
| 36-39 | Address of register in processor/memory of IC to which message packet is to be transmitted. |
| 40-71 | Data of the message packet. |
| 72 | Parity bit. |

This message packet format is depicted in FIG. 4. Because of time delays amounting to fifteen clock cycles that are introduced by line assigner 205, it takes at least a total of 88 clock cycles for a message packet to be completely processed and delivered by one or more routing circuits. Accordingly the length of a routing cycle is 88 basic clock cycles as shown in FIG. 9.

Figure 9:
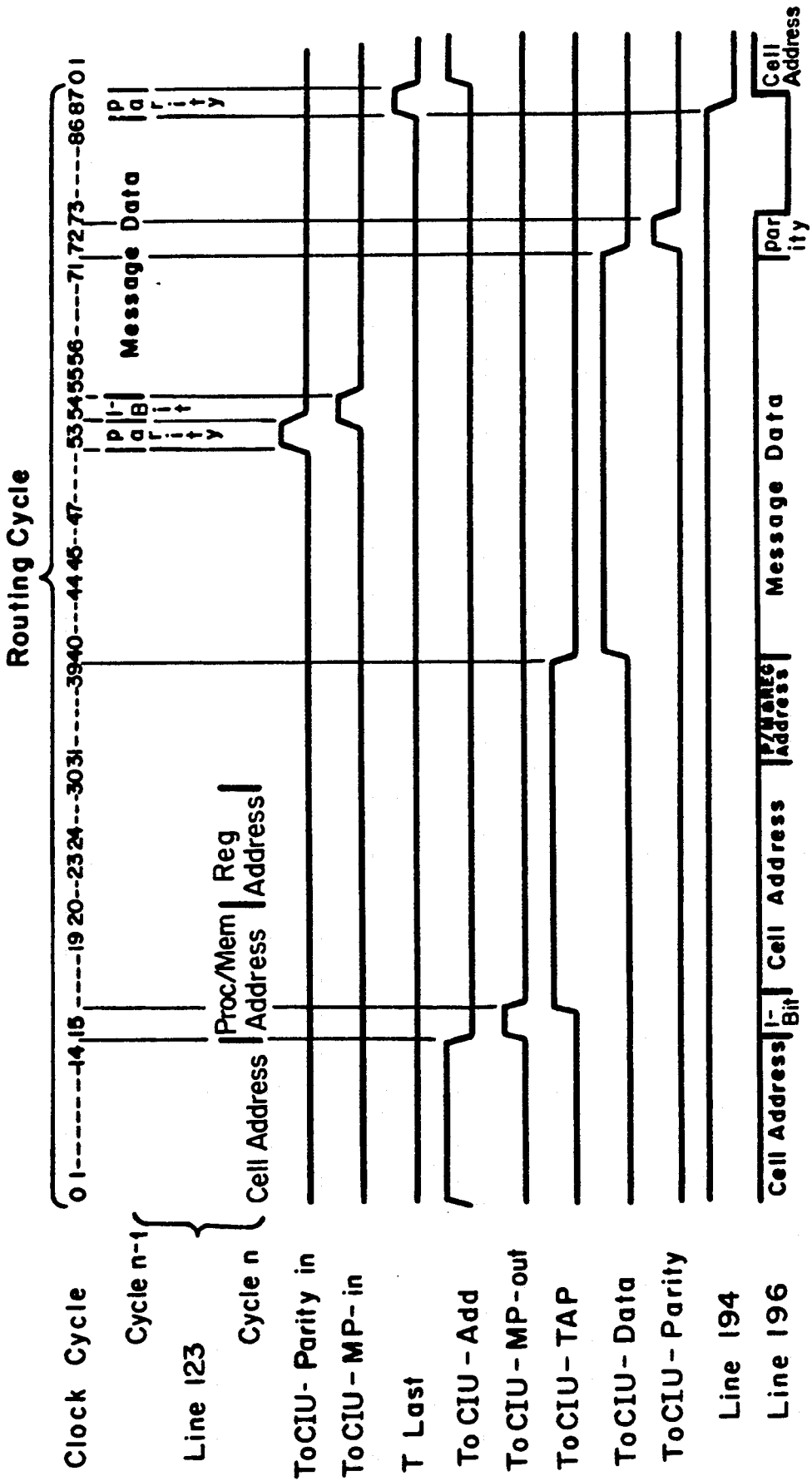
FIGS. 9 and 10 depict certain waveforms useful in understanding the operation of the circuit of FIG. 8.

To control the signal flow from CIU 180 to routing circuit 200, timing generator 140 generates the timing signals shown in FIG. 9. The message packet received by CIU 180 on line 123 is depicted in two lines near the top of FIG. 9. The first bit received at CIU 180 that is associated with the message packet is the parity bit received at clock cycle 53. This bit is set in flip-flop 332 when the signal $T_{OCIU-PARITY-in}$ is applied to the set terminal of this flip-flop during clock cycle 53. This bit is the parity of the address in absolute value of the source IC. A flip-flop 334 and an XOR gate 336 compute the parity of the message packet commencing with the format bit at clock cycle 15 and continuing to the end of the message at clock cycle 72. This parity bit and the bit stored in flip-flop 332 are then compared by an XOR gate 338 and the resulting bit is provided to selector 186 where it is inverted and forwarded to routing circuit 200.

The parity bit is calculated in this fashion to account for changes that are made in the relative address as the message packet is routed to its destination. The relative address of the message packet is computed as the message packet is read out of a processor/memory onto signal line 123; and the parity bit for the message packet including one copy of this relative address is computed by flip-flop 334 and XOR gate 336. If the relative address has an odd number of 1-bits, the parity bit for this message packet will be wrong at the time the message packet is received at its destination. To compensate for this, CIU 180 will change the computed parity bit in XOR gate 338 if the parity bit for the IC address of the source is a 1-bit. At the destination, CIU 180 will again compute the parity bit of the received message packet and will change it if the parity bit received in the message packet is a 1-bit. Finally, the resulting parity will be compared with the parity bit of the address of the destination IC. It can be shown that there has been no parity error if these two bits are the same.

During clock cycle 54 a 1-bit is provided to CIU 180 if a message packet is to be transmitted in the next routing cycle. This bit, which is inverted by inverter 181, is set in flip-flop 312 when the signal $T_{OCIU-MP-in}$ is applied to the set terminal of this flip-flop during clock cycle 54. As a result the Q output terminal of flip-flop 312 is low following clock cycle 54 if a message packet is to be transmitted. During clock cycles 55 through 86 the message data is applied to the input terminal of shift register 184 and shifted therethrough. Because the register is seventy-three bits long, the message data begins to emerge at the output of the shift register during clock cycle 40 of the following routing cycle. During clock cycle 87, the output signal of the Q terminal of flip-flop 312 is set in flip-flop 314 when the signal $T_{LAST}$ is applied to the set terminal of flip-flop 314. As a result, if a message is to be sent, a low signal is present at the Q terminal and a high signal at the Q terminal of flip-flop 314 from a time prior to the start of the routing cycle. As shown in FIG. 8, the Q terminal of flip-flop 314 is connected to one input to AND gate 328 and the Q terminal is connected to line 194. Accordingly, if a message is to be sent, the signal on line 194 is as shown in FIG. 9.

During clock cycles 0-14, the IC address of the destination of the message packet is applied on line 123 to shift register 184 and to AND gate 326. During these clock cycles AND gate 326 is enabled by the signal $T_{OCIU-Add}$ and the IC address is therefor applied through NOR gate 330 to line 196 to routing circuit 200. During clock cycle 15, AND gate 328 is enabled by the signal $T_{OCIU-MP-out}$, thereby applying the signal from the Q terminal of flip-flop 314 to NOR gate 330 and line 196. If a message is to be sent, the signal at the Q terminal is a low signal which is inverted by NOR gate 330 to provide a high signal for the format bit of the message packet.

During clock cycles 15-19, the address of the particular processor/memory in the destination IC is applied to CIU 180 and shifted into shift register 184 and during clock cycles 20-23 the address of the register in the destination processor/memory is shifted into the shift register.

During clock cycles 16-39, AND gate 322 is enabled by the signal $T_{OCIU-TAP}$. During these clock cycles the fifteen bits of the destination IC address, the five bits of the processor/memory address and the four bits of the register address appear successively at the tap between the sixteenth and seventeenth shift positions and are passed by AND gate 322 and NOR 330 to line 196.

During clock cycles 40-71, the message data that was inserted into shift register 184 during the previous routing cycle begins to emerge from the output terminal of the shift register. During these clock cycles AND gate 324 is enabled by the signal $T_{OCIU-DATA}$ and the message data is therefore applied through NOR gate 330 to line 196 to routing circuit 200. Because gate 324 is not enabled during any other clock cycle, any data that are applied to shift register 184 at times other than clock cycles 55-86 of the previous cycle are ignored.

Finally, during clock cycle 72, AND gate 320 is enabled by the signal $T_{OCIU-PARITY}$ and the parity bit is applied through NOR gate 330 to line 196 to routing circuit 200. As a result, the signal on line 196 during the routing cycle is as shown in FIG. 9.

When a message packet is to be received from routing circuit 200, the signal on line 197 will go low during clock cycle 45 and will remain low until the beginning of the next routing cycle. In addition, CIU I80 expects to receive the following information from routing circuit 200 on line 198 at the basic clock cycles indicated:

| Clock Cycle | Information |
|---|---|
| 46-50 | Address of processor/memory to which incoming message packet is being sent. |
| 51-54 | Address of register in processor/memory to which incoming message packet is being sent. |
| 55-86 | Data of incoming message packet. |
| 87 | Parity bit for message packet. |

The signal on line 199 will also go low at the end of the routing cycle and will remain low until the signal on line 194 changes.

As the incoming message packet is being received at CIU 180, the CIU supplies the following signals to message data input signal line 122 at the basic clock cycles indicated:

| Clock Cycle | Information |
|---|---|
| 0-44 | A 1-bit if a message packet from CIU 180 is being received and forwarded by routing circuit 200. |
| 45 | A 1-bit if an incoming message packet is to be delivered to the processor/memories. |
| 46-50 | Address of processor/memory to which incoming message packet is being sent. |
| 51-54 | Address of register in processor/memory to which incoming message packet is being sent. |
| 55-86 | Data of incoming message packet. |
| 87 | Parity bit for message packet. |

Figure 10:
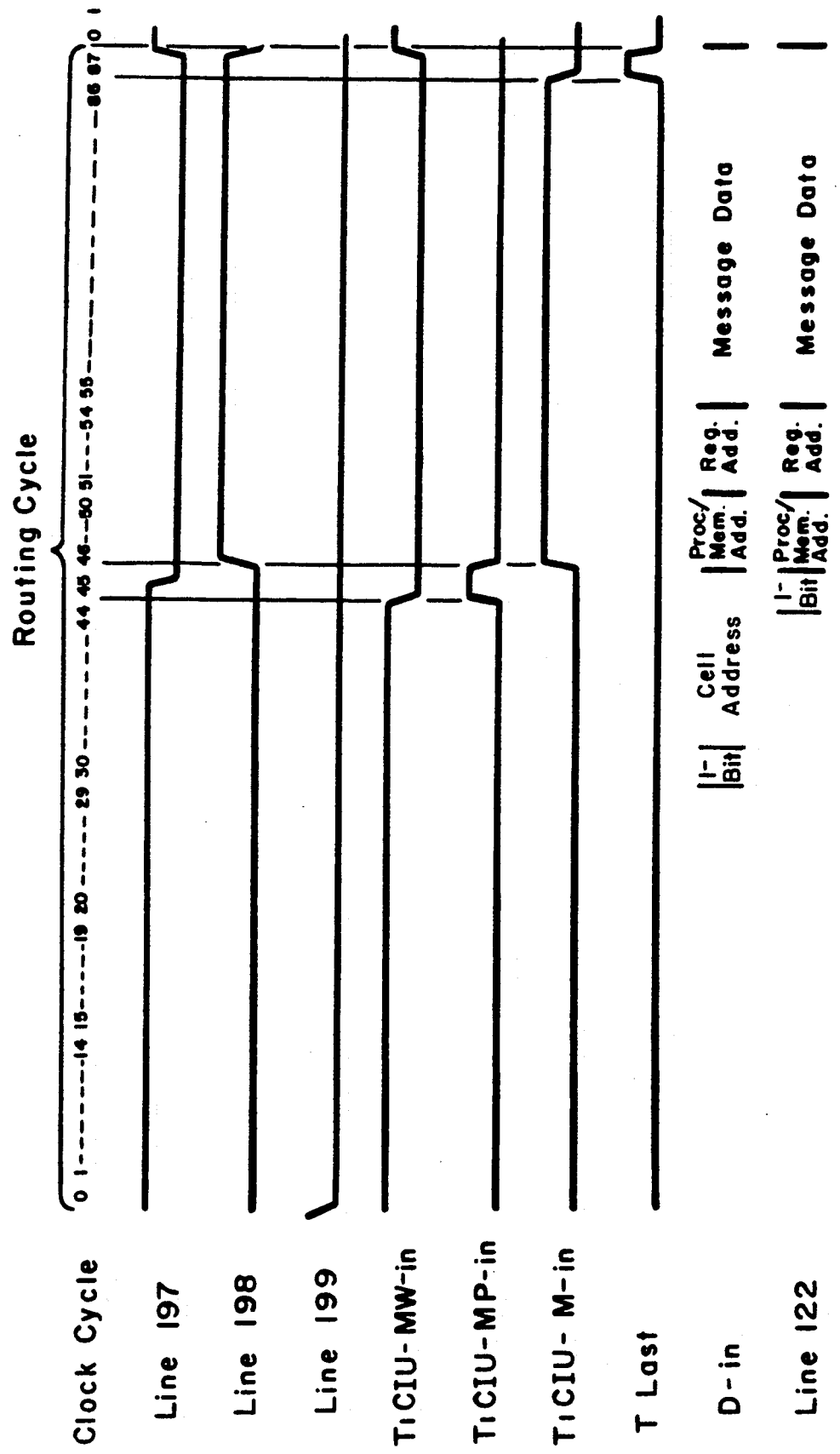

To control this signal flow, timing generator 140 also generates the signals shown in FIG. 10. If a message packet from CIU 180 is being received and forwarded by routing circuit 200, the signal on line 199 is low from the beginning of the routing cycle. During clock cycles 0-44, AND gate 346 is enabled by the signal $T_{ICIU-MWIN}$ to pass this signal to NOR gate 352 where it is inverted and supplied as 1-bits to signal line 122.

The fact that there is an incoming message packet is established when the signal on line 197 goes low during clock cycle 45. This signal is applied to AND gate 342 which is enabled by the signal $T_{ICIU-MP-in}$ during clock cycle 45. As a result, a low signal is applied through NOR gate 352 to provide a high signal during clock cycle 45 on message data input line 122.

During clock cycles 46-50, selector 188 receives on line 198 the address of the processor/memory to which the incoming message packet is being sent. This signal is inverted by inverter 340 and applied to AND gate 348 which is enabled by the signal $T_{ICIU-M-in}$ during clock cycles 46 through 86. As a result, the processor/memory address is passed through NOR gate 352 to signal line 122.

In like fashion, during clock cycles 51-54 and 55-86, selector 188 receives on line 198 the register address to which the incoming message packet is being sent and the data of the message packet. These signals are also inverted by inverter 340 and passed through AND gate 348 and NOR gate 352 to signal line 122 to processor/memories 36. The signals received on line 198 are also applied to XOR gate 358 and flip-flop 356 for computation of the parity bit of the received message packet.

During clock cycle 87 the parity bit of the message packet is received on line 198. It is compared with the computed parity bit at XOR gate 358 and the resulting parity bit is provided to AND gate 344. During clock cycle 87, AND gate 344 is enabled and the parity bit is provided through NOR gate 352 to message data input signal line 122.

As a result, the signal applied to the processor/memory 36 during a routing cycle is as shown in FIG. 10.

Description of Routing Circuit

Introduction

Figure 11:
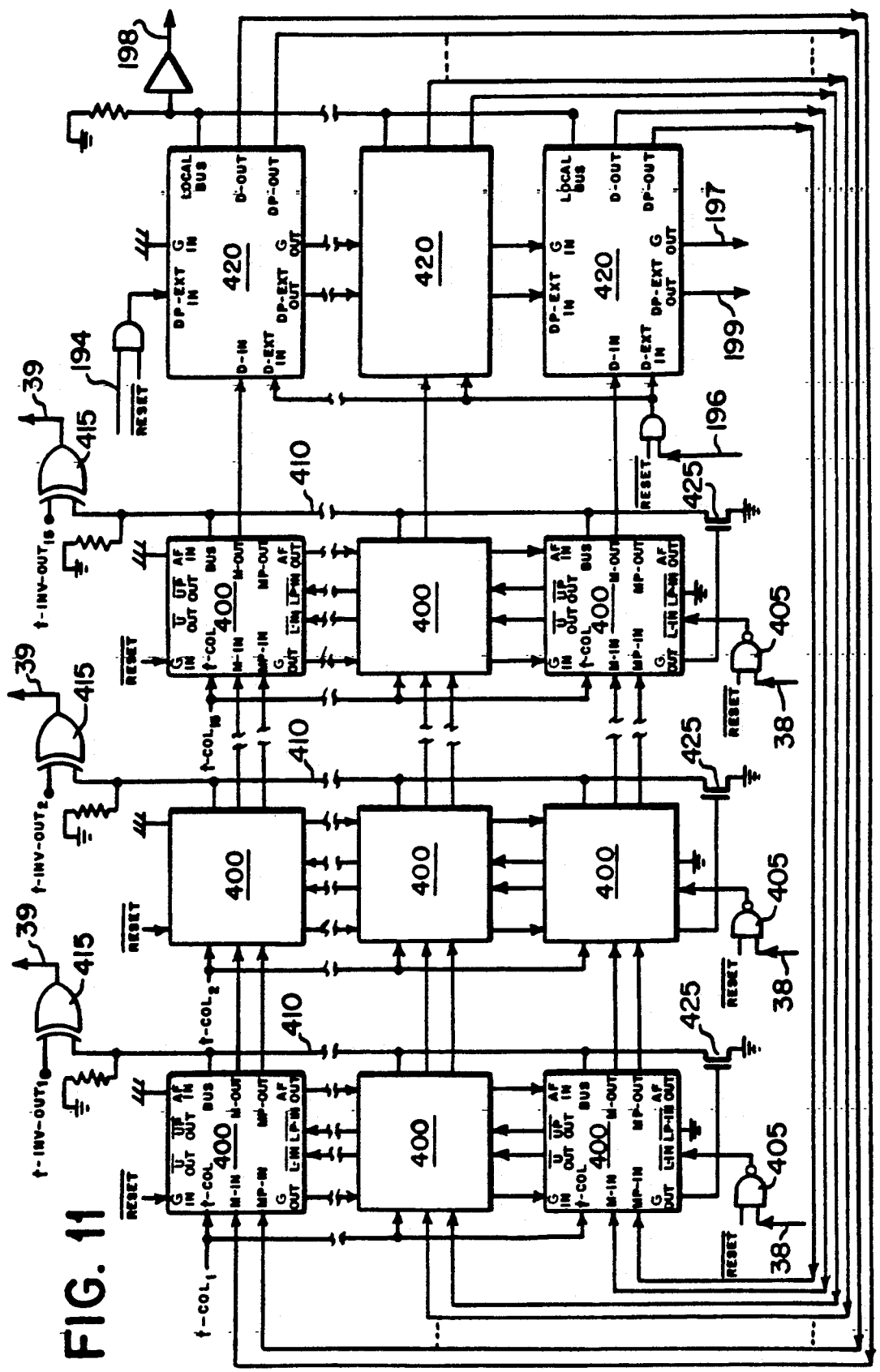
FIG. 11 is a block diagram of a routing circuit depicted in the block diagram of FIG. 6B.

As shown in FIG. 6B, routing circuit 200 comprises line assigner 205, message detector 210, a buffer and address restorer 215, and message injector 220. Line assigner 205 comprises a fifteen by fifteen array of substantially identical routing logic cells. Each column of this array controls the output of message packets in one dimension of the Boolean 15-cube. Each row of this array controls the storage of one message packet in routing circuit 200. Nine such routing cells 400 are illustrated in FIG. 11, the three in the lefthand column being associated with the first dimension, the three in the middle column being associated with the second dimension and the three in the righthand column being associated with the fifteenth dimension. Each column of cells has an output bus 410 connected to the output line 39 associated with its dimension. With respect to the rows, the bottom three cells are the lowermost cells in the array and receive inputs from input lines 38. The top three cells are the uppermost cells in the array. The middle three cells are representative of any cell between the bottom and the top but as shown are connected to the bottommost row.

Also shown in FIG. 11 are three processing and storage means 420 which represent the portions of the message detector 210, buffer and address restorer 215 and message injector 220 of routing circuit 200 that process and store messages from the corresponding three rows of cells 400 in line assigner 205. Twelve similar processing and storage means (not shown) are used to process and store messages from the other rows. Means 420 are described in greater detail in FIG. 15.

If no routing conflicts are encountered, a message packet will be routed from an input to a routing cell of the first dimension to the register in the processor/memory to which it is addressed during one message cycle of 88 basic clock signals. If there are routing conflicts, the message packet will be temporarily stored in the processing and storage means of a routing circuit at one or more intermediate points; and more than one routing cycle will be required to route the message packet to its destination.

FIG. 11 provides a convenient summary of the input and output terminals of each routing cell 400. As indicated by the three cells 400 along the bottom row, message packets from the different dimensions of the Boolean 15-cube are applied to NAND gates 405. These gates are enabled at all times except during the reset condition. The output of each NAND gate 405, which is the inverted message packet, is applied to an input terminal $\overline{L}_{in}$ of one of cells 400 in the lowermost row. A signal representing the presence of a message packet at terminal $\overline{L}_{in}$ is also applied to an input terminal $\overline{LP}_{in}$ of the same cell. For each cell in the bottom row, this message present signal is held at ground which has the effect of conditioning the cell in the next column in the bottom row for further processing of the message packet received at the cell. As will become apparent, such message present signals representing the presence of a message packet at an input to the cell are used throughout routing circuit 200 to establish data paths through circuit 200 for the message packets.

A message packet received from one of lines 38 is routed out of the lowermost cell 400 in one column from the terminal M-OUT and is applied to the terminal M-IN of the cell 400 in the column immediately to its right. At the same time, the message present signal is routed out of the terminal MP-OUT to the terminal MP-IN of the cell immediately to the right.

The signal received at the M-IN terminal of any cell 400 may be routed out of the cell on any one of the BUS terminal, the $\overline{U}_{OUT}$ terminal or the M-OUT terminal, depending on what other signals are in the network. The BUS terminals of all the cells 400 in one column are connected to common output bus 410 that is connected through an XOR gate 415 to output line 39 to the nearest neighbor cell in that dimension of the Boolean n-cube. The other input to XOR gate 415 is a timing signal t-INV-OUT$_n$ where n is the number of the dimension. This timing signal complements the appropriate address bit in the duplicate address in the message packet so as to update this address as the message packet moves through the Boolean 15-cube.

Messages that leave the cell from the $\overline{U}_{out}$ terminal are applied to the $\overline{L}_{in}$ terminal of the cell immediately above it in the column and are processed by that cell in the same fashion as any signal received on an $\overline{L}_{in}$ terminal. The message present signal is transferred in the same fashion from a $\overline{UP}_{out}$ terminal to an $\overline{LP}_{in}$ terminal of the cell immediately above it.

The circuitry in the cells 400 in each column is designed to place on output bus 410 of each column (or dimension) the message addressed to that dimension which is circulating in the row closest to the top and to compact all rows toward the top row. To this end, control signals Grant (G) and All Full (AF) are provided in each column to inform the individual cells of the column of the status of the cells above them in the column. In particular, the Grant (G) signal controls access to output bus 410 of each column or dimension by a signal that is applied down each column of cells through the $G_{in}$ and $G_{out}$ terminals. The circuitry that propagates this signal provides bus access to the uppermost message packet in each column that is addressed to that dimension and prevents any messages in any lower cells in that column from being routed onto the output bus. The All Full (AF) signal controls the transfer of messages from one cell 400 to the cell above it in the same column by indicating to each cell through the AF$_{out}$ and AF$_{in}$ terminals whether there is a message in every cell above it in the column. If any upper cell is empty, the message in each lower cell is moved up one cell in the column.

Operation of certain flip-flops in the cell is controlled by the timing signals t-COL$_n$ where n is the number of the dimension while other flip-flops are clocked by the basic clock signal phi 1. As will become apparent from the following description, the routing cells in each column operate in synchronism with all the other routing cells in the same column of all the routing circuits in array 30.

For the cells in the top row, the input to the AF$_{in}$ terminal is always high. For these cells, the input signal to the G$_{in}$ terminal is the complement of the reset signal and therefore is high except during reset. As a result, a message packet in the top cell in a column will normally have access to output bus 420 if addressed to that dimension. If, however, an output line 39 should become broken, this line can be removed from the interconnected 15-cube network by applying a low signal to the G$_{in}$ input terminal of the top cell of the dimension associated with that line. At the bottom row of cells 400, the Grant signal from the G$_{out}$ terminal is used to control a pass transistor 425 that can apply a ground to the output bus. In particular, if there is no message to be forwarded on that output line, 0-bits are written to the output line of that dimension.

Line Assigner 205

Figure 12:
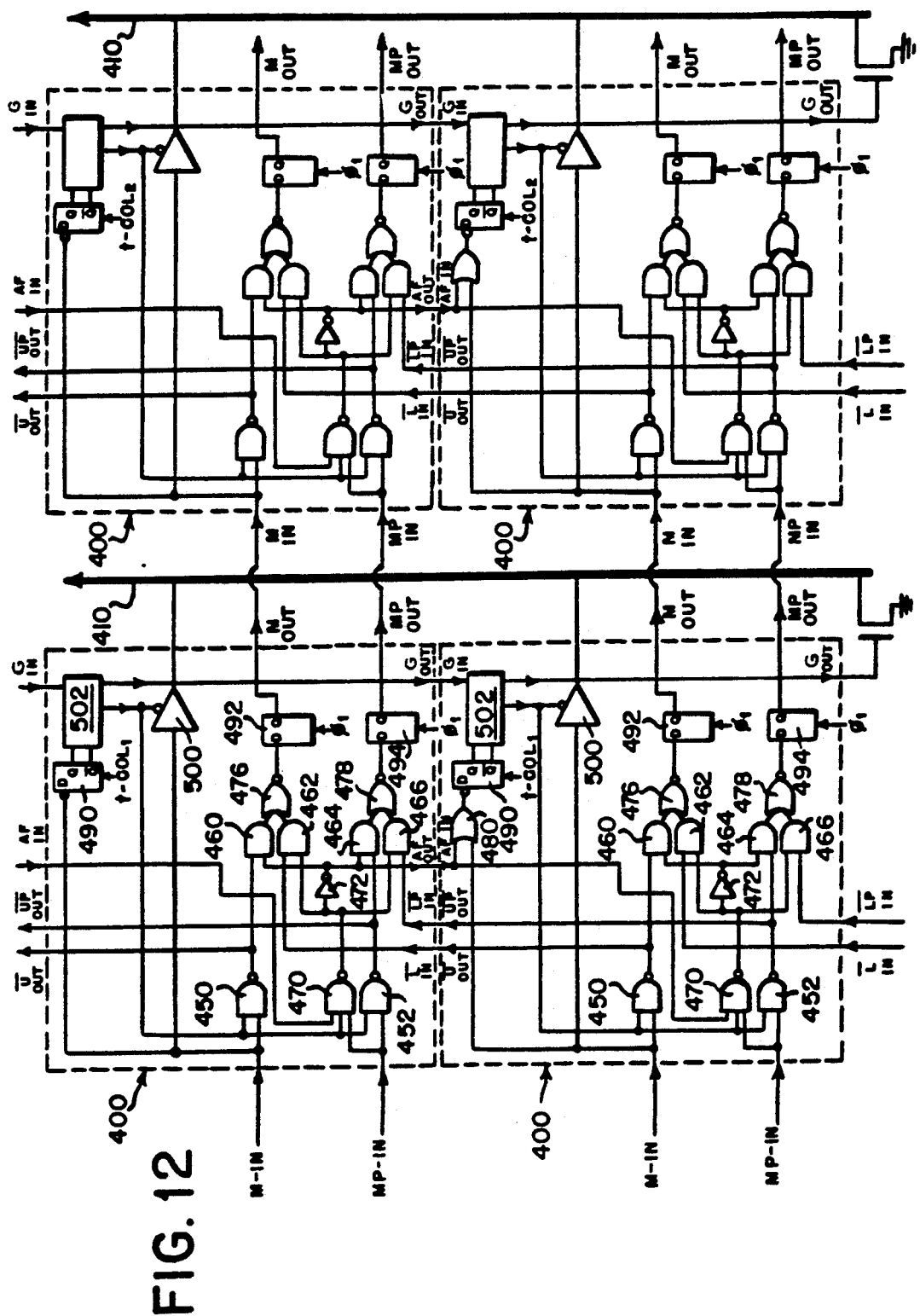
FIG. 12 is a logic diagram of an illustrative embodiment of a line assigner in the routing circuit of FIG. 11.

Specific details of the logic circuitry of line assigner 205 are shown in FIG. 12. This figure shows four cells which illustratively are in the lowermost two rows and in the columns associated with the first and second dimensions. The circuits are substantially the same with the exception of an OR gate 480 as will be explained below. Each circuit has input lines or terminals $\overline{L}_{in}$, $\overline{LP}_{in}$, M-IN and MP-IN, as explained in connection with FIG. 11. Each circuit also has output lines or terminals $\overline{U}_{out}$, $\overline{UP}_{out}$, bus, M-OUT and MP-OUT. Control signals are supplied to each cell at terminals $G_{in}$ and AF$_{in}$ and with the exception of the bottommost cells these control signals are also passed via terminals $G_{out}$ and AF$_{out}$ to the next lower cell in the column.

The logic circuitry comprises two NAND gates 450 and 452, four AND gates 460, 462, 464 and 466 which control the selection of output signals to the terminals M-OUT and MP-OUT, a NAND gate 470 and an inverter 472 which enable either the pair of AND gates 460 and 464 or the pair of AND gates 462 and 466, a NOR gate 476 which combines the outputs of AND gates 460 and 462, and a NOR gate 478 which combines the outputs of AND gates 464 and 466. The output of inverter 472 is also the All Full (AF) signal which is applied by terminal AF$_{out}$ to the next lower cell in the column to control the shifting of signals from the M-IN and MP-IN lines to the $\overline{U}_{out}$ and $\overline{UP}_{out}$ lines. In addition, the cells in the bottommost row include an OR gate 480 whose inputs are connected to the AF$_{in}$ and M-IN terminals. Each cell also includes three D-type flip-flops 490, 492 and 494, a bus drive 500 and a logic circuit 502 for controlling the bus drive and the grant signal.

Flip-flop 490 records the leading bit of the message packet upon receipt of a column clock signal t-COL$_n$ and holds this signal until receipt of the next column clock signal, 88 basic clock cycles later. If the leading bit is a 1-bit, and if the output bus 410 has not been granted to a cell higher up in the column, logic circuit 502 applies a low signal to the bus drive. The low output on the line to bus drive 500 enables the bus drive and disables NAND gates 450, 452 and 470. As a result, the message on input terminal M-IN will be routed out on bus 410 to the output line 39 associated with that column or dimension. When NAND gate 470 is disabled, its output is high, enabling AND gates 462, 466 and causing the output from inverter 472 to be low, thereby disabling AND gates 460, 464. As a result, the All Full (AF) signal applied to the next lower cell is low, indicating to that cell that there is an empty cell above it in the column and AND gates 462, 466 are enabled to pass signals received at input terminals $\overline{L}_{in}$ and $\overline{LP}_{in}$.

If the leading bit of the message packet is a 0-bit or if there is no message packet at the M-IN terminal of the routing cell, the output of logic circuit 502 to bus drive 500 will be high. The high signal to the bus drive will also be applied to NAND gates 450, 452 and 470 and will enable gates 450 and 452. If the All Full signal at terminal AF$_{in}$ is also high, which indicates that there are messages in each of the upper cells in that column, NAND gate 470 will also be enabled.

If the signal at the MP-IN terminal is high when gate 470 is enabled, a high signal is applied via inverter 472 to AND gates 460 and 464, thereby enabling those gates; and a low signal is applied to AND gates 462 and 466, thereby disabling those gates. As a result, the signals at the M-IN and MP-IN terminals are applied through NAND gates 450, 452, AND gates 460, 464, and NOR gates 466, 468 to the inputs to flip-flops 492, 494. Flip-flop 492 is set with every basic clock cycle phi 1. As a result, the first output bit of the message packet that is transmitted through flip-flop 492 is the bit immediately following the leading bit applied to flip-flop 490; and the original leading bit of the message packet is discarded. Moreover, the new leading bit is delayed by one basic clock cycle before it becomes available at the output terminal M-OUT of the routing cell. Thereafter, each successive bit of the message packet is clocked through this flip-flop and made available at the terminal M-OUT to the M-IN terminal of the next cell. Flip-flop 494 is likewise set with every clock signal phi 1; but this output of flip-flop 494 remains constant for the duration of the message packet. As a result, the high signal MP-IN that is applied to the input to flip-flop 494 becomes available at the output terminal MP-OUT of the routing cell at the same time as the new leading bit of the message packet becomes available at the output terminal M-OUT. The signal at the MP-OUT terminal is then applied to the MP-IN terminal of the next cell and is used to establish a data path through that cell for the message packet received at the M-IN terminal.

Because flip-flops 492, 494 are present in the cells 400 of each of the fifteen columns of line assigner 205, the message packet is delayed by fifteen basic clock cycles as it works its way through the fifteen columns or dimensions of one or more line assigners.

If the signal at the MP-IN terminal is low when NAND gate 470 is enabled, the output of gate 470 is high, thereby enabling AND gates 462, 466 and causing the output from inverter 472 to be low. As a result, the All Full (AF) signal applied to the next lower cell will be low, indicating to that cell that there is an empty cell above it in the column, and AND gates 462, 466 will be enabled to pass signals received at input terminals $\overline{L}_{in}$ and $\overline{LP}_{in}$.

When the All Full signal received at a cell is low, NAND gate 470 is disabled with the result that AND gates 460 and 464 are disabled. Thus, any message packet at the M-IN terminal cannot be routed to the M-OUT terminal. However, if the leading bit of the message packet is a 0-bit, AND gates 450, 452 will be enabled after the set signal t-COL$_n$ is applied to flip-flop 490. Moreover, AND gates 462, 466 are enabled in the next cell above that cell in the column. As a result, the signals at the M-IN and MP-IN terminals are applied via the U$_{out}$ and UP$_{out}$ terminals to the L$_{in}$ and LP$_{in}$ terminals of the next higher cell in the column and are passed through AND gates 462, 466 and through NOR gates 476, 478 to flip-flops 492, 496 in that next higher cell. These flip-flops operate in the same fashion as and in synchronism with all the other flip-flops 492, 494 in that column of routing cells to provide the message packet and message present signals to the output terminals M-OUT and MP-OUT terminals of that cell.

OR gate 480 in each cell in the lowermost row of cells is used to force onto output bus 410 any message packet that enters a cell in the lowermost row of cells through the M-IN terminal and would otherwise leave that cell through the M-OUT terminal because all the cells above it in the column were full. This is done regardless of the address of the message packet in order to ensure that there is space in the routing circuit for any incoming message packet on the dimension associated with that column of cells. The inputs to OR gate 480 are All Full (AF) and the first bit of the address of the message packet. The All Full signal will be high when all the upper cells in the column are full; and under such circumstances the output bus will be available. Accordingly, regardless of the state of the first address bit of the message packet, the output of OR gate 480 will be high and the input to flip-flop 490 will be the same as when the leading bit of a message packet is a 1-bit. When this bit is set in flip-flop 490, the output of logic circuit 502 will be a low signal to bus drive 500 that enables the bus drive and passes the message packet from M-IN to bus 420 regardless of the address of that message packet.

XOR gate 415 of each column or dimension updates the relative address at bit positions 16 through 30 of the message packet. One input to this gate is the message packet being forwarded on output bus 410 to line 39. The other input is a signal t-INV-out$_n$, where n is the number of the dimension, that is applied to the XOR gate of each dimension at the same time as the address bit for that dimension in the second address of the message packet. As a result, the relative address bit is complemented indicating that the message packet has been routed out on that dimension. When the message packet has not been forced out onto output bus 410, the pertinent bit in the second address in the message packet will be a 1-bit; and this bit will be complemented to a 0-bit, indicating that the message has been routed to the desired address in that dimension. When the message packet has been forced onto output bus 410, the pertinent address bit in the message packet will be a 0-bit; and this bit will be complemented to a 1-bit, indicating that the message packet has been routed away from the desired address in that dimension. At a later time, it will be necessary to route the message packet back to the desired address in this dimension.

Figure 13:
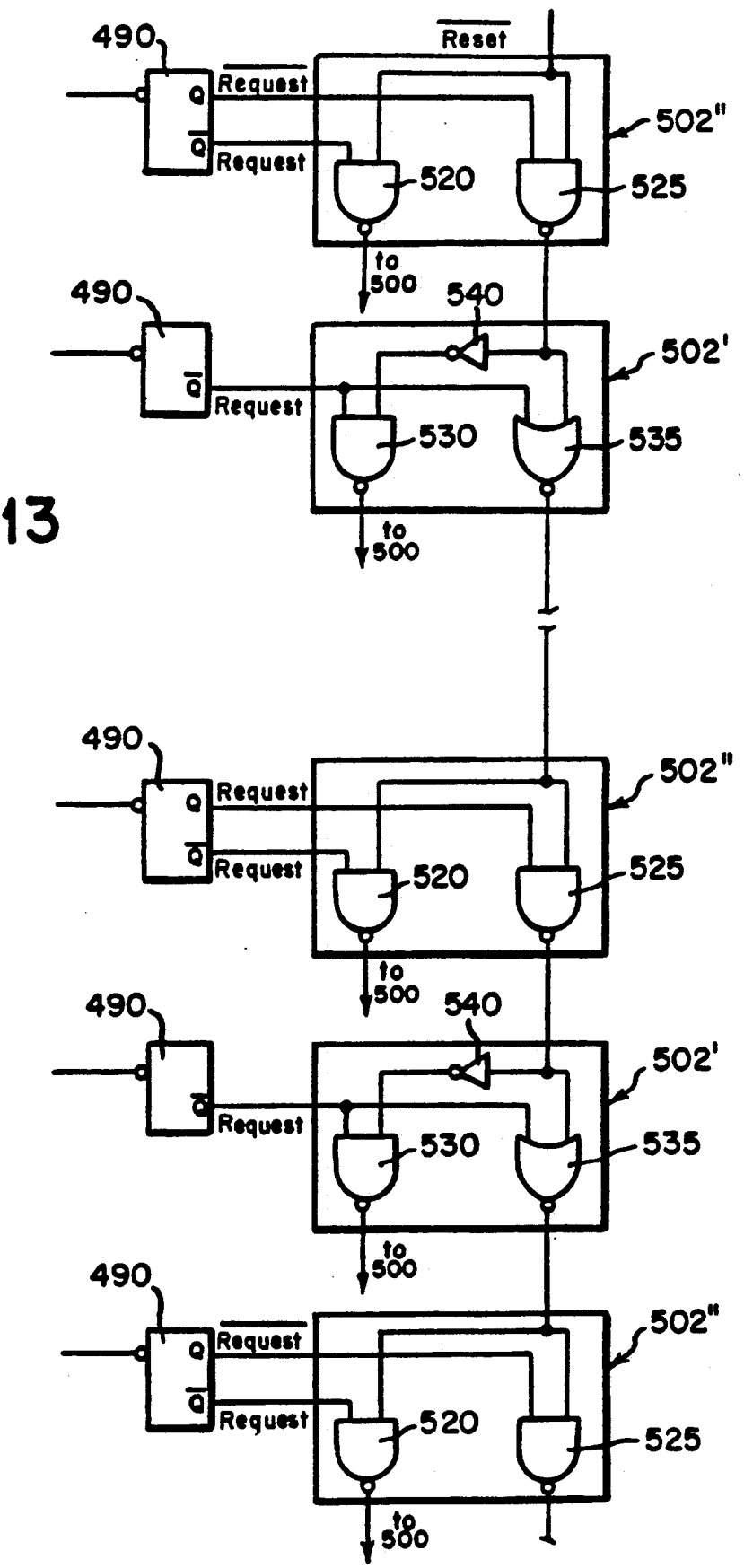
FIG. 13 is a logic diagram of a portion of the line assigner of FIG. 12.

Details of logic circuit 502 are shown in FIG. 13. In order to minimize propagation delay through the logic circuits 502 of the cells in one column, the Grant signal is inverted at every cell in the column. As a result, the internal circuitry of logic circuits 502 in the odd-numbered rows is different from that in the even-numbered rows in a column. In FIG. 13, the top row is considered to be the zero row and is even; the logic circuits in the even-numbered rows are identified by 502''; and those in the odd-numbered rows by 502'. Each even-numbered logic circuit 502'' comprises first and second NAND gates 520, 525. Each odd-numbered logic circuit 502 comprises a NAND gate 530, a NOR gate 535 and an inverter 540. NAND gates 520 and 530 control the grant of bus access. If both inputs to these gates are high, the gate produces a low output signal that grants access to output bus 410. If bus access is granted by an even-numbered cell 502'', the output of NAND gate 525 will be high. If bus access is granted by an odd-numbered cell 502', the output of NOR gate 535 will be low. In addition, if a high signal is received at an odd-numbered cell from the even-numbered cell above, it in the column, the output of NAND gate 530 will be high and that of NOR gate 535 will be low; and if a low signal is received at an even-numbered cell from the odd-numbered cell above it in the column, the output of NAND gates 520 and 525 will be high. As a result, whenever one cell grants access to output bus 420, no cell below it in the column will be able to get access to the output bus. Conversely, if bus access has not been granted, each cell will provide to the cell immediately below it a signal that enables such cell to grant bus access if access is requested.

Figure 14:
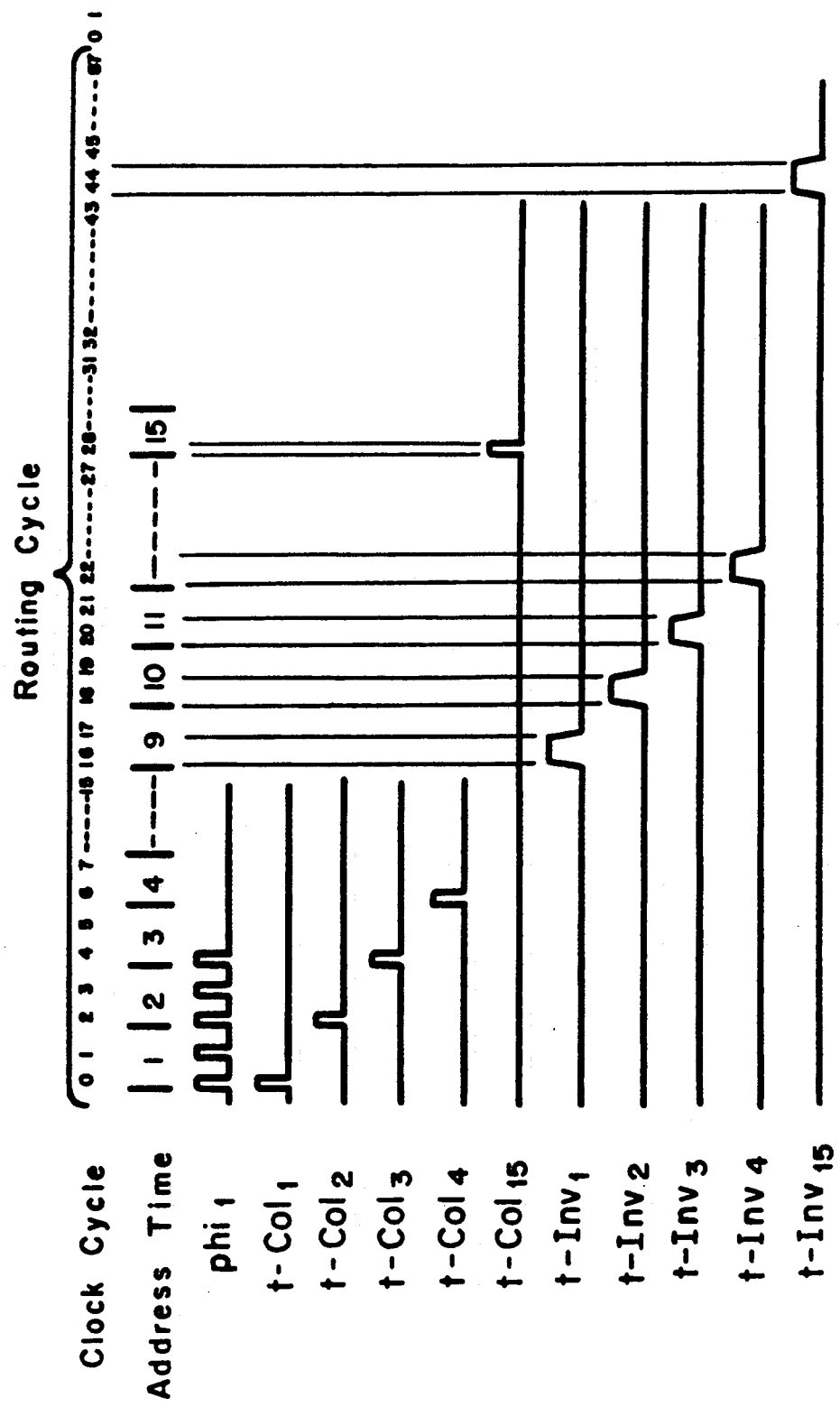
FIG. 14 depicts certain waveforms useful in understanding the operation of the circuit of FIGS. 11-13.

Cells 400 in the different columns are timed by the timing signals t-COL$_n$ so as to process the address bits of the message packets. At the beginning of a routing cycle all the message packets to be routed are presented at the inputs M-IN to the cells 400 of line assigners 205 in the different ICs 35. Each of the fifteen address bits is then analyzed one at a time in fifteen address time periods of two basic clock cycles each. As shown in FIG. 14, the timing signal t-COL$_l$ is applied to flip-flops 490 of the first column of all the line assigners during basic clock cycle 0. As a result, the first bit of each message packet is recorded by a flip-flop 490 and is tested by logic circuit 502 for a 1-bit. Logic circuits 502 in the first column of each line assigner grant access to bus 410 of the first dimension to the message packet having a leading 1-bit that is located in the row nearest the top in each line assigner. As a result, at least some of the message packets having a leading 1-bit are routed onto output bus 410 of the first dimension and are forwarded on output line 39 to the lowermost routing cell 400 in the first column of the line assigners in the nearest neighbor ICs. The other message packets at the M-IN terminals of the cells of the first dimension of all the line assigners are compacted upward in the cells of the first column and clocked through flip-flops 492 to the M-OUT terminals of the first column of cells. At the same time, the message packets that are routed to nearest neighbor ICs are received by the lowermost cells in the first column of the line assigners of those ICs and are clocked through flip-flops 492 of those cells to the M-OUT terminals. As indicated above, flip-flops 492 delay the message packets by one clock cycle; and the leading bit presented to flip-flop 490 is discarded.

When the timing signal t-COL$_2$ is applied during clock cycle 2 to flip-flops 490 of the second column of cells in the line assigners, these flip-flops record the new leading bit of each message packet. Again, logic circuits 502 in the second column of each line assigner grant access to bus 410 of the second dimension to the message packet having a leading 1-bit in the uppermost row of the second column of each line assigner; and the other message packets are compacted upward in the second column of cells and provided to the M-OUT terminal of each cell after a delay of one clock cycle. Again, the message packets that are routed out on bus 410 of the second dimension to a nearest neighbor IC are received at the lowermost cell of the second column of the line assigner of that cell and are clocked through flip-flops 492 of those cells to the M-OUT terminals. The leading bit of the message packet is also discarded.

In like fashion, each message packet advances through the remaining thirteen dimensions of the line assigners, with the leading bit being tested in each column and discarded, and with the message packets being delayed by one clock cycle. While this process is going on, the message packet is wending its way from the line assigner of one IC to that of another in accordance with the routing specified by its address bits but subject to the availability of the desired output line 39. As a result, after clock cycle 29, the first fifteen bits of each message packet have been discarded but the format bit of each message packet has reached the output of a flip-flop 492 in one of the cells in the fifteenth column of a line assigner. If no routing conflicts were encountered during its routing, this line assigner is located at its destination and the message packet can then be provided to its destination processor/memory. If routing conflicts were encountered, the message packet is at an intermediate point and will have to wait for at least one more routing cycle to complete its journey. Upon completion of clock cycle 29 the remainder of the message packet will be strung out behind the format bit, the first 29 bits of the message packet being located in the line assigners of one or more ICs and the final 27 bits still in shift register 184 of CIU 180 of the IC from which the message packet originated.

For example, if a message packet originates from IC 000 000 000 000 111 and is addressed to IC 110 000 000 000 010, the relative address specified by the message packet will be 110 000 000 000 101. If no routing conflicts are encountered, this message packet will be routed as follows. The message packet will be formed by one of the processor/memories 36 in IC 000 000 000 000 111 and applied to processing and storage means 420. Beginning with clock cycle 0 in a routing cycle, the bits of this message packet will be presented one at a time to the M-IN terminal of one of cells 400 in the first column of the line assigner of this IC. During clock cycle 0 in address time 1, timing signal t-COL$_l$ will be applied to flip-flops 490 of the first column of each line assigner. At IC 000 000 000 000 111, this will record the leading bit of the address in a flip-flop 490. Because this bit is a 1-bit and we have assumed there are no routing conflicts, logic circuit 502 will route the message packet to bus 410 of the first dimension. Accordingly, the message packet will be routed down the address line 39 of the first dimension to IC 100 000 000 000 111, where it will be applied to flip-flop 492 of the lowermost cell in the first column of cells. There the message packet will be delayed by one clock cycle. During clock cycle 2 in the second address time period, the new leading bit of the message packet will be tested and again found to be a 1-bit. Accordingly, the message packet will now be routed down output line 39 of the second dimension to the IC having the address 110 000 000 000 111. During clock cycles 4, 6 . . . 22 of the next ten address time periods, the then leading bit of the IC address will be tested by logic circuit 502 in each of columns 3 through 12 of the line assigner of IC 110 000 000 000 111, In each case, the logic circuit will identify a 0-bit, compact the message packet upward in the line assigner, discard the leading bit and route the message packet on to the next column after a delay of one clock cycle.

During clock cycle 24 in the thirteenth address time period, logic circuit 502 will test the then leading bit of IC address and identify a 1-bit. Assuming no conflicts in routing, it will then route the message packet to IC 110 000 000 000 011, where it will be received by the lowermost cell in the thirteenth column of the line assigner and delayed by one clock cycle.

During clock cycle 26 in the fourteenth address time period, the timing signal t=COL$_{14}$ will be applied to flip-flops 490 of the fourteenth column of each line assigner. At IC 110 000 000 000 011 a 0-bit will be recorded in the flip-flop 490 of the lowermost cell in the fourteenth column. As a result, the message packet is retained in that IC and is provided after a delay of one clock cycle to the fifteenth column of cells.

During clock cycle 28 of the fifteenth address time period, the timing signal t-COL$_{15}$ is applied to flip-flops 490 of the fifteenth column of each line assigner At cell address 110 000 000 000 011, one of these flip-flops records the remaining 1-bit in the address of the message packet. Assuming no routing conflicts, logic circuit 502 grants bus access to the message packet and routes the message packet to flip-flop 492 in the lowermost cell in the line assigner at address 110 000 000 000 010. At the beginning of clock cycle 30, the format bit of the message packet is presented to the storage and processing means of the routing circuit at address 110 000 000 000 010.

During the routing of the message packet, signals t-INV$_n$ are applied to XOR gates 415 of the different columns or dimensions of line assigners at the same time as the address bit for that dimension in the duplicate address of the message packet. These signals complement the address bit for that dimension of the duplicate IC address through which the message packet is then being routed. Several of these signals are shown in FIG. 14. For the example of message packet routing that is discussed above, signals at clock cycles 16, 18, 40 and 44 invert the four 1-bits of the duplicate relative address of the message packet. As a result, when the message packet is presented to the storage and processing means, all of the bits of the duplicate address are 0-bits.

Storage and Processing Means 420

Storage and processing means 420 routes message packets to the processor/memories on the chip, forwards message packets from the processor/memories, and stores message packets that cannot be forwarded from the cell immediately upon receipt because of a prior allocation of a particular output line 39. As shown in FIG. 11, for each row of cells 400 in line assigner 205 of the routing circuit, there is an individual processing and storage means identified by block 420. The input terminals to each block are D-IN which is connected to the output terminal M-OUT of the corresponding cell in the fifteenth column of the line assigner, D-EXT$_{in}$ which supplies the message packet provided to the routing circuit on line 196 from CIU 180, and DP-EXT$_{in}$ which supplies the signal applied to the routing circuit on line 194 from CIU 180. The signal applied to DP-EXT$_{in}$ is used to locate the uppermost available processing and storage means 420 and to provide the message packet from CIU 180 to such means 420. Another input to each processing and storage means 420 is a Grant signal which is used to extract the message packet addressed to that particular cell that is located in the uppermost processing and storage means 420. The output terminals from each processing and storage means 420 are D-OUT and DP-OUT which are connected to the M-IN and MP-IN terminals of the cell 400 in the same row in the line assigner and the local bus terminal which supplies a message packet over line 198 to CIU 180. In addition, each processing and storage means 420 has output terminals DP-EXT$_{out}$ and G$_{out}$ that are connected to the corresponding terminals DP-EXT$_{in}$ and G$_{in}$ of the processing and storage means of the row immediately below. The signals at the terminals DP-EXT$_{out}$ and G$_{out}$ of the lowest processing and storage means 420 provide the signals on lines 199 and 197, respectively, to CIU 180. In particular, if a message packet is provided over line 198 to CIU 180, the Grant signal that provides access to line 198 will also cause the signal on line 197 to go low at the time it provides such access. And if a message packet from CIU 180 is accepted by processing and storage means 420, the signal at terminal DP-EXT$_{out}$ and on line 199 will be low.

Figure 15:
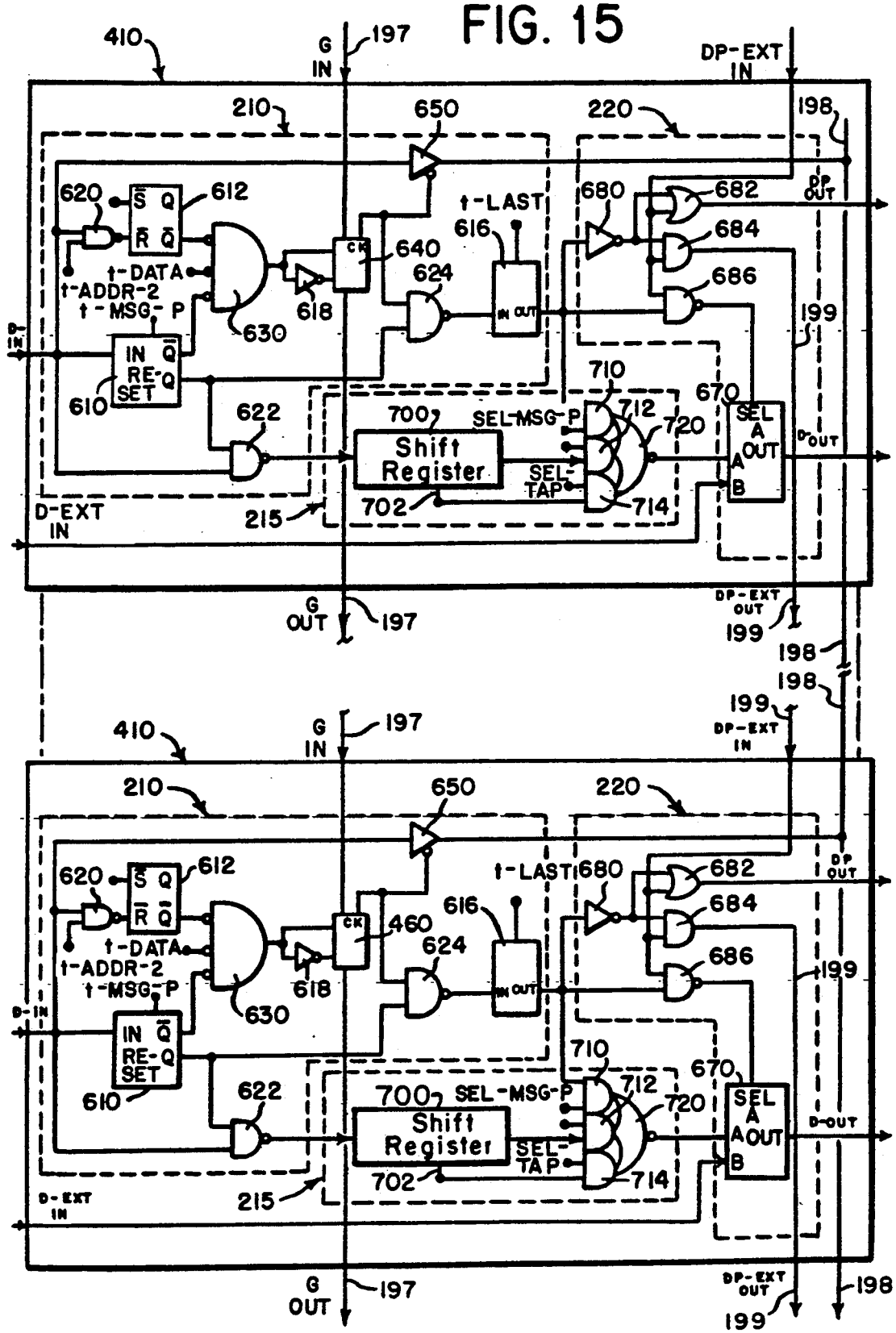
FIG. 15 is a logic diagram of an illustrative embodiment of additional portions of the routing circuit depicted FIG. 11.
Figure 16:
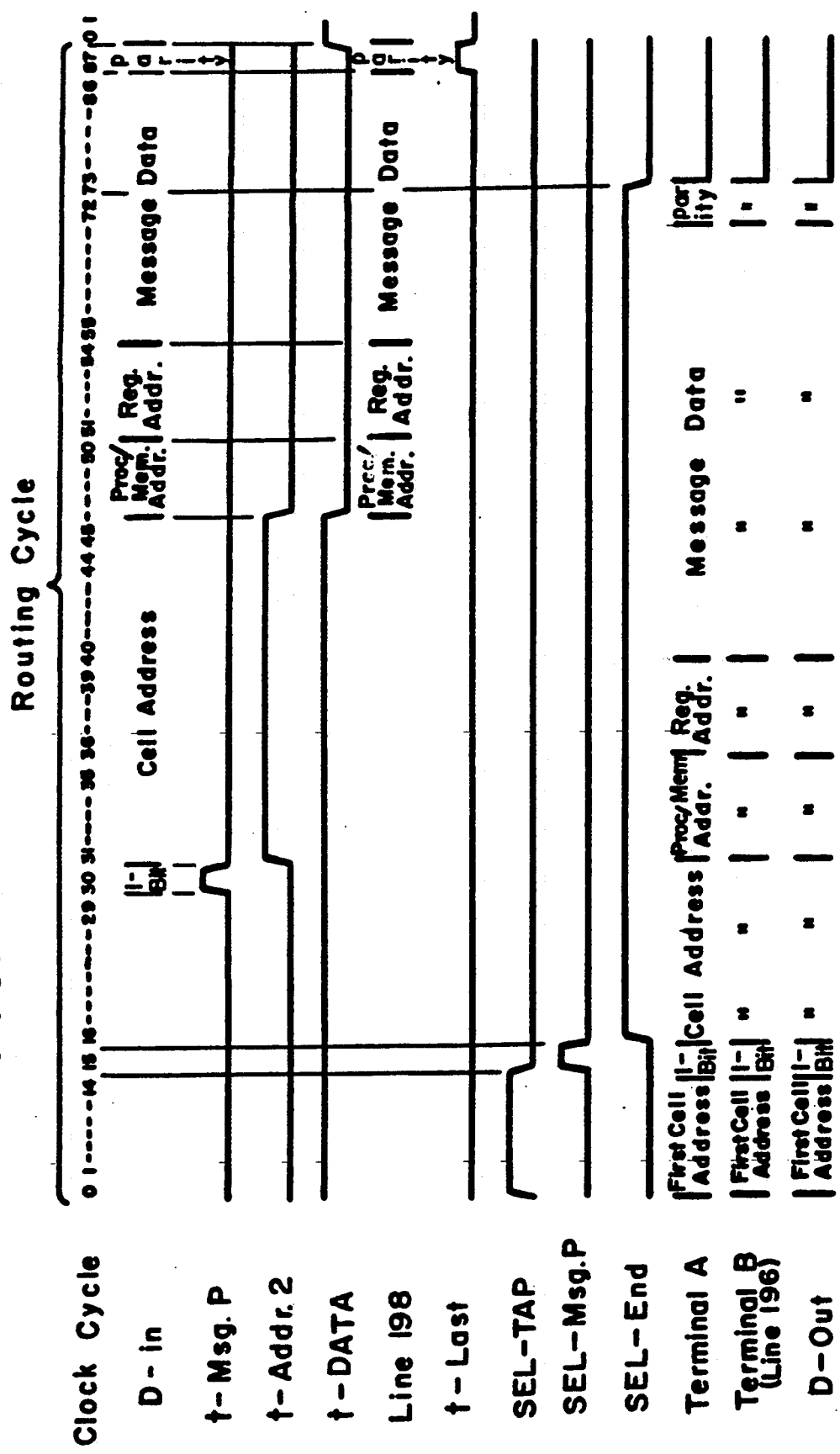
FIG. 16 depicts certain waveforms useful in understanding the operation of the circuit depicted in FIG. 14.

Each processing and storage means 410 comprises a message detector 210, a buffer and address restorer 215 and a message injector 220 that are shown in detail in FIG. 15. Timing diagrams for signals used with this circuitry to process the message packet of FIG. 4 are shown in FIG. 16. Each message detector comprises three latches 610, 612, 616, an inverter 618, three NAND gates 620, 622, 624, an AND gate 630, a logic circuit 640 and a bus driver 650. Latch 610 checks for the format bit transmitted between the two copies of the address of the message packet. This bit indicates the presence of a message as distinguished from no message at all. The latch can be set only when the signal t-MSGP is received at the set terminal during basic clock cycle 30. If the format bit is identified at this clock cycle, a high signal is set at output terminal Q and a low signal at terminal $\overline{Q}$ of latch 610. NAND gate 620 and latch 612 check the duplicate address of the message packet to determine if all the bits are 0-bits. Latch 612 is set during clock cycle 0 and its output at the $\overline{Q}$ terminal will remain low unless and until a low signal is received from NAND gate 620. Gate 620 is enabled by the signal t-ADDR2 only during receipt of the second address of the message packet during basic clock cycles 31–45. If all the address bits are 0-bits, the message packet has reached the correct cell in the array and may be routed to CIU 180; and the output of NAND gate 620 will remain high. Latch 612 accordingly provides a low signal at output terminal $\overline{Q}$ of latch 612. Advantageously, to minimize interference from transients, the signal t-ADDR2 is ANDed with the clock signal phi1 so that NAND gate 620 is enabled only during the phi1 phase of each clock cycle 31–45.

Low signals from the $\overline{Q}$ terminals of latches 610 and 612 enable AND gate 630. During clock cycle 44 and throughout clock cycles 45–87 when the non-address portion of the message packet is available at the D-IN terminal, the signal t-DATA is low, thereby producing a high signal at the output of AND gate 630. This high signal is a request for access to line 198 to CIU 180. The high signal and a low signal formed by an inverter 618 are applied to logic circuit 640 and bus driver 650 to grant bus access to the uppermost row that seeks such access and to deny such access to all other rows. Logic circuit 640 and bus driver 650 illustratively are the same type of devices as logic circuit 502 and bus driver 500 of FIGS. 12 and 13 and operate in the same fashion; and the signals from AND gate 630 and inverter 618 function in the same fashion as the signals from the Q and $\overline{Q}$ terminals, respectively, of latch 490. As a result, the G$_{out}$ signal on line 197 from the processing and storage means 420 in the lowest row of routing circuit 200 will go low as soon as access is granted to bus 198.

The output from the Q terminal of latch 610 and the bus access output from logic circuit 640 are applied to NAND gate 624. The bus access output of circuit 640 will be low only when bus access is granted to the message packet at input terminal D-IN. At such time the output of NAND gate 624 will be high. This output is applied to the input of latch 616; and when the signal t-LAST is applied to the latch during clock cycle 87 at the end of the message cycle, this high signal is stored in the latch. The output of NAND gate 624 will also be high if there is no message circulating in this row of the routing circuit. Under such circumstances, latch 610 will not be set during clock cycle 30 and the signal at the Q terminal of latch 610 will be low, causing the output of NAND gate 624 to be high. The output of latch 616 is applied to both buffer and address restorer 215 and message injector 220.

The Q output of latch 610 is also applied to NAND gate 622 along with the signal from the D-IN terminal. As a result, NAND gate 622 is enabled when the message format bit is detected and the gate inverts the message packet received at the D-IN terminal as it is being supplied to the buffer-restorer.

Message injector 220 comprises a selector 670, an inverter 680, an OR gate 682, an AND gate 684 and a NAND gate 686. The output of latch 616 is applied to inverter 680 and NAND gate 686. The signal on line 194 is applied to the terminal DP-EXT$_{in}$ in the top row of the processing and storage means 410 where it is connected to NAND gate 686 as well as to OR gate 682 and AND gate 684. The output of NAND gate 686 is applied to the select terminal of selector 670. If this signal is high, the signal at terminal A of the selector is supplied to the D-OUT terminal. If the signal is low, the signal at terminal B is supplied to the output terminal D-OUT.

As indicated in the discussion of CIU 180 in conjunction with FIG. 8, flip-flop 314 is set by the signal t-LAST during basic clock cycle 87. As a result, the signal on line 194 to terminal DP-EXT$_{in}$ is high from a time prior to the start of the message cycle whenever there is a message packet at CIU 180 that is to be delivered to message injector 220. Latch 616 is also set by the signal t-LAST during basic clock cycle 87. As a result, if the output of NAND gate 624 is high as it is when a message packet is being delivered to bus 198 to CIU 180, the output of latch 616 will also be high from a time prior to the start of the message cycle. The high signals from latch 616 and terminal DP-EXT$_{in}$ cause the output of NAND gate 686 to be low. As a result, terminal B of selector 670 is connected to the terminal D-OUT of message injector 220 and the message packet on line 196 from CIU 180 is accepted by message injector 220 and supplied to the D-OUT terminal.

At the same time, the high signal from latch 616 is applied to inverter 680 to disable AND gate 684 and provide a low signal to the DP-EXT$_{out}$ terminal. This signal will disable the AND gates 684 in all the lower rows and thereby provide a low signal at the DP-EXT$_{out}$ terminal of each of these rows. These low signals will also provide a high signal to the select terminal of latch 670 in all the lower rows. As a result, the message on line 196 can only be delivered to one row of injector 220. In addition, the low signal from the output terminal DP-EXT$_{out}$ of the message injector for the lowermost row of routing circuit is applied on line 199 to CIU 180 to indicate that an outgoing message packet has been accepted by message injector 220 for application to line assigner 205. The high signal applied from the terminal DP-EXT$_{in}$ to OR gate 682 of the message injector row that accepts the signal on line 196 also provides a high signal at the terminal DP-OUT, indicating the presence of a message at the terminal D-OUT.

In the alternative, there may be no message circulating in this row, or the message may not be addressed to this cell. If there is no message circulating, the input to NAND gate 624 from the Q terminal of latch 610 will be low and the output of latch 616 will be high during the next message cycle. Under these circumstances a message packet from line 196 can be accepted by the message injector just as in the case where the row was emptied by writing the message packet into bus 198.

If there is a message present in the row but it is not addressed to that cell, both inputs to NAND gate 624 will be high with the result that the output of NAND gate 624 is low and the output of latch 616 will be low from a time prior to the start of the message cycle. As a result, the output of NAND gate 686 and hence the input to the select terminal of selector 670 will be high; and the signals applied to terminal A of the selector will be supplied to the D-OUT terminal. In addition, the low signal will be inverted by inverter 680 to provide a high signal at the DP-OUT terminal indicating that a message is present in the row. The output of inverter 680 will also enable gate 684. As a result, if there is a request from CIU 180 on line 194 to insert a message in one of the rows, this signal will be passed by AND gate 684 and the DP-EXT$_{out}$ terminal to the next lower row.

The message packet that is supplied to terminal A of selector 670 is the message packet with first and second relative cell addresses. This message packet is supplied by buffer restorer 210 which stores the message packet received at the D-IN terminal and reconstitutes the first relative cell address from the second relative cell address.

Buffer restorer 210 comprises a shift register 700, AND gates 710, 712, and 714, and a NOR gate 720. The message packet is shifted into shift register 700 as it arrives at the D-IN terminal. This register has sufficient length to store the entire message packet from the beginning of the second relative cell address to the last error correction bit. As shown in FIG. 14, register 700 has a tap 702 that is located sixteen shift positions from its output terminal. As a result, as the message packet is shifted through the shift register, the first sixteen bits of the message packet become available in succession at the input to AND gate 714 before these bits reach the output end of the shift register. The first fifteen of these bits are the relative cell address.

In order to reconstruct the first relative cell address, gate 714 is enabled by the signal SEL-TAP during basic clock cycles 0–14 when these bits are present at tap 702 and the output of gate 714 is applied through NOR gate 720 to terminal A of selector 670. During clock cycle 15, AND gate 710 is enabled by the signal SEL-MSGP so as to generate the format bit. This bit is obtained from the output of latch 616 and the output of AND gate 710 is applied through NOR gate 720 to terminal A of selector 670. During clock cycle 15, the output of latch 616 will be high if a message packet is being transferred to bus 198 or if no message packet has been received at the D-IN terminal during that message cycle. In these instances, the signal passed by AND gate 710 will be a high signal that is inverted by NOR gate 720 to indicate the absence of a valid message packet at the output of buffer and restorer 215. In all other circumstances, the output of latch 616 will be low; and this signal will be inverted by NOR gate 720 to indicate that the message packet from buffer and restorer 215 is valid. After these sixteen cycles the message packet being shifted through the shift register 700 reaches the output terminal and therefore the input to AND gate 712. At that time and throughout basic clock cycles 16–72 gate 712 is enabled by the signal SEL-END to provide the second relative cell address and the rest of the message packet to terminal A of selector 670.

Example

An example of the generation and reception of a message packet at a register of a processor/memory 36 is as follows. Table VII specifies the information available at the following registers and flags of the processor/memory of interest in this example.

TABLE VII

| Register | | Information |
|---|---|---|
| 1 | 0001 | Destination Address (Absolute) |
| 2 | 0010 | Local Address (Absolute) |
| 3 | 0011 | Status |
| 4 | 0100 | Data To Be Sent |
| 6 | 0110 | Even - Receive Data |
| 7 | 0111 | Odd - Receive Data |
| 14 | 1110 | DataIn |
| 15 | 1111 | Zeroes |
| Flag | | |
| 1 | 0001 | Don't Receive Bit |
| 2 | 0010 | Sink |
| 6 | 0110 | Global |
| 7 | 0111 | ComE |
| 13 | 1101 | DataIn |
| 15 | 1111 | Zero |

The local address information is stored in register 2 with four bits of register address at columns 0 through 3, five bits of address identifying the local processor/memory at columns 4 through 8, fifteen bits of IC address at columns 9 through 23 specifying the address of the IC in absolute values and one bit of parity at column 24 which provides parity for the IC address. If a message is available to be sent, the message data is stored in register 4, the address of its destination including IC chip, processor/memory and register is in register 1 in the same order as the local address information in register 2, a request to send bit is set as a 1-bit in column 0 of status register 3 and a request to send flag is set as a 1-bit in global flag register 6. For this example, message packets can be received into either an even-receive register 6 (if the register address is 1110) or an odd-receive register 7 (if the register address is 1111). For information stored at these points, Table VIII sets forth the instructions required to generate a message packet that forwards the data in register 4 to the IC specified by the address in register 1 and to receive the data of a message packet:

TABLE VIII

| Cycle | Oper. | Read Reg A | Write Reg A | Reg B | Col. | Read Flag | Write Flag |
|---|---|---|---|---|---|---|---|
| 51 | 10110 | 0011 | 1111 | 1111 | 00000 | 0110 | 0111 |
| 52 | 11100 | 0011 | 0011 | 1111 | 00000 | 0110 | 0010 |
| 53 | 01000 | 0010 | 1111 | 0010 | 11000 | 1111 | 0010 |
| 54 | 01000 | 1111 | 1111 | 1111 | 00000 | 0111 | 0010 |
| 55 | 11100 | 0111 | 0111 | 0100 | 00000 | 1101 | 0010 |
| 56 | 11100 | 0111 | 0111 | 0100 | 00001 | 1101 | 0010 |
| . | | | | | | | |
| 86 | 11100 | 0111 | 0111 | 0100 | 11111 | 1101 | 0010 |
| 87 | 11000 | 1110 | 1111 | 0010 | 11000 | 1111 | 0110 |
| 0 | 11000 | 0001 | 1111 | 0010 | 01001 | 1111 | 0010 |
| 1 | 11000 | 0001 | 1111 | 0010 | 01010 | 1111 | 0010 |
| . | | | | | | | |
| 14 | 11000 | 0001 | 1111 | 0010 | 10111 | 1111 | 0010 |
| 15 | 11000 | 0001 | 1111 | 1111 | 00100 | 1111 | 0010 |
| . | | | | | | | |
| 19 | 11000 | 0001 | 1111 | 1111 | 01001 | 1111 | 0010 |
| 20 | 11000 | 0001 | 1111 | 1111 | 00000 | 1111 | 1111 |
| 21 | | | | | | | |
| −23 | 01010 | 1111 | 1111 | 1111 | 00001 | 1111 | 0010 |
| 24 | 11101 | 0011 | 0011 | 1111 | 00000 | 1101 | 0010 |
| 25 | | | | | | | |
| −38 | 11000 | 1111 | 1111 | 1111 | 00001 | 1111 | 0010 |
| 39 | 01000 | 0011 | 1111 | 1111 | 00000 | 1111 | 0110 |
| 40 | | | | | | | |
| −43 | 01000 | 0011 | 0011 | 1111 | 00000 | 1100 | 0010 |
| 44 | 11100 | 0011 | 0011 | 0011 | 00000 | 1100 | 0010 |
| 45 | 01001 | 1111 | 1111 | 1111 | 00000 | 1101 | 0001 |
| 46 | 11000 | 1110 | 1111 | 0010 | 00100 | 0001 | 0001 |
| . | | | | | | | |
| 50 | 11000 | 1110 | 1111 | 0010 | 01001 | 0001 | 0001 |

During cycle 51 and ComE bit will be set if the local processor/memory wants to send a message and no processor/memory higher up in the Daisy chain has made a request to send. At this time any request to send from the present processor/memory would already have been stored as a 1-bit in global flag register 6 and any request to send from higher processor/memories would have been stored as a 1-bit in 0 column of the status register 3. Whether the present processor/memory can send is calculated by complementing the status bit and forming the AND of this complemented bit and the contents of the global flag register 6. The result is written to the ComE flag register. If the ComE bit is set, NAND gate 293 is enabled, thereby providing the signals on carry output line 287 to signal line 123 to CIU 180. During cycle 52 the 1-bit in global register 6 is written into the 0-column of the status register by the SWAP operation.

During cycle 53 the processor/memory provides the parity bit for its IC address to line 123 to CIU 180. As indicated above, this parity bit is stored in column 24 of register 2. It is read out during the read cycle by taking the OR of the contents of this column of register 2 with a 0-bit obtained from the 0 flag. The result of this operation is provided on the carry output line to the data sink in flag register 2 and to NAND gate 293 from which it is provided to line 123.

During cycle 54, a 1-bit is forwarded if a message packet is to be sent. This 1-bit is set in ComE flag register 7. It is read by taking the OR of register 15 which contains zeroes and the contents of the ComE flag register. The result of this operation is provided through NAND gate 293 to line 123.

During cycles 55 through 86, data are read out of register 4 one column at a time; and if the don't receive flag is low, data are written into one of the receive registers 6, 7, one column at a time. Simultaneous sending and receiving of message packets is accomplished by the SWAP operation which provides the output of register B to the carry output line 287 and provides the input from a flag to register A. Register B is specified as register 4 and for this example register A is specified as register 7. The input from line 122 from CIU 180 is applied to the DataIn flag which is flag 13. During the read portions of each of these cycles, the signal at one column of register 4 and the signal at the DataIn terminal are read. During the write portion of each of these operations the signal on the carry output line is provided through NAND gate 293 to output line 123. At the same time the signal applied to the DataIn, flag 13 from CIU 180 is written into a column of register 7.

As indicated above, the writing of data into register 6 or 7 is conditionalized on the state of don't receive flag 1. This condition is determined by reading flag 1 by means of line 176 and selector 294 and comparing in XOR gate 299 the don't receive flag and the signal on line 178. The signal for reading flag 1 is 0001 on pins 122–25.

During cycle 87 the parity bit of the received message packet is compared with the parity bit of the absolute IC address in register 2. This is done by using the MOVE operation to perform the exclusive OR of the signal at the DataIn flag input with the parity bit at column 24 of register 2. If there is no parity error, the result of this operation should be a low signal that is written to global flag register 6. Microcontroller 20 checks this line to monitor for parity errors.

During cycles 0 through 14, the relative IC address for the message packet is generated and provided to CIU 180. This is accomplished by using the MOVE operation to form the exclusive OR of the absolute value of the IC address of the source and the absolute value of the IC address of the destination and to provide it to the carry output line.

During cycles 15 through 19 the address of a particular processor/memory within the IC is read out of register 1 and provided to the carry output line by the MOVE operation. During cycle 20 one bit is sent specifying whether the destination register should be odd or even, and during cycles 21 through 23 additional bits are sent specifying the address of the destination register. In the present example the state of the bits sent during cycles 21 through 23 is irrelevant since data is written only to register 6 or register 7 depending on the state of the bit generated during cycle 20. For convenience, the bits sent out during cycles 21 through 23 are 1-bits obtained by inverting the output of zero register 15 and zero flag input 15 and taking the OR of such values.

During cycle 24 a test is made if a message packet is being supplied to line 123 to determine if the routing circuit has accepted the message packet. Acceptance is indicated by a low signal on line 199 which is inverted by NOR gate 352 and applied to the DataIn flag during cycles 0–44. During cycle 24, this signal is inverted again and written into the 0 column of status register 3 by means of the SWAP operation.

Cycles 25 through 38 are free so the instructions for these cycles provide a non-operation (NOP) of transferring 0-bits by means of the MOVE operation.

During cycle 39 the processor/memory calculates whether it will request permission to send a message packet in the next routing cycle. This information is obtained from the status register and is provided by an OR operation to global flag register 6 which provides an output on line 124. During cycles 40–43 a request to send is read from the status register and applied via the carry output line to the Daisy inputs of the processor/memories that are below the local processor/memory in the Daisy chain on the chip. At the same time, inputs from the processor/memories that are higher up in the Daisy chain are read from the Daisy input and provided by the carry-output to processor/memories lower in the chain. Four cycles are allowed to assure that each request to send from a processor/memory is propagated down through the chain. During cycle 44, the request to send from any processor/memory higher up in the chain is written to the carry output line and this information is also written to the status register.

During cycle 45, a 1-bit will be provided on line 122 to the DataIn flag if a message is to be delivered to this IC. This bit is used to calculate the state of don't receive flag register 1 by setting this register with a 0-bit which is opposite to the state of the input at ComIn. This is done by complementing the DataIn input and writing it to flag register 1 by means of an OR operation.

During cycles 46 through 50, a processor/memory address is delivered on line 122 from CIU 180. Each processor/memory compares this address with its own address by using the MOVE operation to take the exclusive OR of these two addresses and to accumulate any difference that is observed in flag register 1. If no differences are observed, flag register 1 retains a 0-bit indicating that the local processor/memory is the destination of the message packet.

The routing cycle then continues until all message packets have been delivered.

Alternatives

As will be apparent to those skilled in the art, numerous modifications may be made in the above described system within the spirit and scope of the invention. The use of a mainframe computer 10, microcontroller 30, and a rectilinear array of processor/memories, and the provision of data to and from such processor/memories by data source 40 and data sink 90 and associated buffers are only exemplary. For example, if the mainframe computer is fast enough, instruction sequence generation could be provided by the computer instead of the microcontroller. Alternatively, in many applications there is no need to use a mainframe computer for operation of the microcontroller and array of processor/memories. Other configurations of data source 40, buffers 50, 60, 65, 70, 75, 80 and data sink 90 will be apparent. While a rectilinear array of processor/memories has the merits of relatively simple organization and fast performance of strictly parallel operations, this organization is not necessary for the practice of the invention. Individual processor/memories could be connected together in a strictly linear array as represented by the spiral connection of FIG. 1B, they could be connected together in two-dimensional hexagonal or octagonal arrays or other configurations, or even in three-dimensional arrays. In some applications, it may be possible to eliminate any connection between the processor/memories on different chips except for that through the routing circuits of the chip.

The number of processor/memories, their partitioning and their individual functions can also be varied. The computer system of the present invention can be made with a smaller or larger number of processor/memories. The advantages of the present invention begin to emerge when approximately 10,000 processor/memories are used. The partitioning of the $2^{20}$ processor/memories so that thirty-two processor/memories are on each chip and sixty-four chips are on each PC board is only exemplary. With present technology this partitioning can be achieved at what is estimated to be a reasonable cost. In the future it is likely that more processor/memories can be provided on each chip. The number of dimensions in the n-cube can be varied to accommodate the number of processor/memories to be interconnected. In some applications it may be advantageous to fabricate the routing circuits on separate integrated circuits from the ICs on which the processor/memories are implemented. In some applications it may also be desirable to use more than one type of processor/memory For example, processor/memories with special arithmetic functions may prove useful along with general purpose processor/memories Design variations may also be implemented in the circuitry of the ICs. For example, pin counts may be altered by time division multiplexing of the instruction pins.

While we have described a routing circuit for a Boolean n-cube in which there are two possible locations for an IC chip in each dimension of the cube, it is possible to practice the invention in which the individual chips are located at more than two positions in one or more dimensions of the n-cube. In such an arrangement, several possibilities exist for connecting the individual chips. One configuration that preserves the general configuration of routing circuit 200 connects the output lines 39 of each dimension of each cell to the input lines 38 of only one other cell in the same dimension. To generalize the connection pattern of input and output lines 38, 39 of each chip 100 of FIG. 5, we note that where a chip is located at the 1 address in a dimension its output line is connected to its nearest neighbor chip located at the 0 address, which address is smaller by one unit, and where a chip is located at the 0 address in a dimension its output line is connected to the chip located at the 1 address which is the highest address in that dimension. To apply this pattern to the case where chips are located at more than two addresses in a dimension, we simply connect the output line of the chip at the highest address to the input of the chip at the next highest address and so forth, and we connect the output line of the chip at the 0 address to the input line of the chip at the highest address. For example, if chips can be located at four addresses in a dimension, we connect the output line of the chip at address 3 to the input line of the chip at address 2, the output line of the chip at address 2 to the input line of the chip at address 1, the output line of the chip at address 1 to the input line of the chip at address 0, and the output line of the chip at address 0 to the input line of the chip at address 3. Alternatively, connections could be made in the opposite direction if desired.

Modifications will also be necessary in the relative address generation and in the routing circuit; but these modifications will also be apparent from a generalization of these functions. Thus, where there are only two IC addresses in each dimension the relative address is determined by taking the exclusive OR of the two addresses. This, however, is the equivalent of subtracting one address from the other and representing negative numbers as complements. Likewise, the routing circuit function of examining the leading address bit to determine if the message packet has reached its destination is in general a matter of determining if the leading address bit is a 0-digit or not. If it is a 0-digit, the message packet has reached its destination in that dimension. Otherwise, it has not and should be routed on to a different address in that dimension. If there are more than two addresses in a dimension, the generation of a relative address and the routing of a message packet specified by such address will be similar. The relative address will be determined by subtracting the address of the destination IC from the address of the originating IC in order to obtain the number of nodes that the message packet must traverse in that dimension in order to reach its destination. Negative numbers are easily handled by converting them to complements. The routing circuit in the bus access logic for each column of the line assigner simply tests for the presence of a 0-digit in the leading address bit of the message packet. If a 0-digit is present, the message packet has reached the address to which it is addressed in that dimension and need not be routed on to a different address in that dimension. If the leading bit is not a 0-digit, the message packet is not at the correct address and can be routed on to the nearest neighbor node whose address in that dimension is one unit smaller. At the time the duplicate address is routed on, the relative address digit for that dimension should be updated by decrementing it by one.

Consideration of this example of a circuit in which there are more than two addresses for an IC chip in one dimension will reveal that such a scheme reduces the number of input and output lines 38, 39 that are used to interconnect the same number of IC chips in the Boolean n-cube described above and therefore increases the probability of routing conflicts. However, in applications where intercommunication between chips is low, such an alternative may prove practical.

With respect to the individual components described above, they likewise are only exemplary. The particular sizes of RAM 250 and flag controller 290 are only illustrative. Larger RAMs and controllers may prove desirable in some applications. Smaller ones can also be used. Bit-serial ALU 280 could be replaced by a parallel ALU and the number of inputs to the ALU and/or outputs from it could be different. The disclosed embodiment of the processor/memory does all address decoding in PLA 150 but in some applications it may be advantageous to do some decoding at individual processor/memories. While the ALU, RAM and flag controller of each processor/memory operate independently of those in the other processor/memories in the embodiment described above, other arrangements are possible. For example, each ALU might have access to one or more of the same RAM registers, such as a single register where the IC address is stored for all processor/memories on an IC chip. While the use of an instruction set of five basic operations of AND, OR, ADD, SWAP and MOVE is preferred, the invention may also be practiced using additional operations In addition, the invention may also be practiced using a different number of instructions from the thirty-two instructions of Table VI.

Numerous variations may also be made in routing circuit 200. The number of columns in line assigner 205 will depend on the number of dimensions in the n-cube. The number of rows can be varied in accordance with the storage requirements of the routing circuits. Such requirements will vary from one system to another depending on how much message packet routing is used in each system. Alternative storage systems will be apparent from the foregoing description In some applications it may be advantageous to provide for multiple input lines 194, 196 to message injector 220 and/or multiple outlet lines 197, 198, 199 from message detector 210 and injector 220. It may also be desirable to sort the message packets in buffer and address restorer 215 in accordance with the number of dimensions through which they must be routed.

Numerous variations may also be made in the processing of instructions. It may be advantageous to overlap routing cycles so that subsequent message packets are being generated before earlier message packets are completely delivered Additional error detection and correction may be provided by using additional parity bits. Conditional operations may be based on more than one flag Indirect addressing may also prove desirable.

Numerous features may also be combined with the above described system in order to enhance its performance For example, each chip may be provided with additional external memory so as to save the state of the contents of the individual dynamic RAMs 250 of each of the processor/memories on the chip. The address of each processor/memory could be provided by hard wiring in order to avoid the need to load each address at the start of operations. Input could be made to each processor/memory directly through an image sensor rather than through data source 40. Alternatively, computer 10 might be provided direct access to the individual register of each processor/memory. Finally, while the invention has been described in terms of current technology of VLSI circuits fabricated in silicon and connected by conventional cables, it should be recognized that the concepts of the invention are transferable to other technologies. Silicon ICs 35 could be replaced by other circuits that provide the same function but are made, for example, of Gallium Arsenide and conventional cables could be replaced, for example, by optical fibers.

What is claimed is:

1. Message switching apparatus comprising:
   a plurality of message inputs on which messages are received;
   a plurality of message outputs on which messages are transmitted;
   storage means for storing said messages, said storage means having a plurality of inputs and an equal number of outputs;
   an array of logic cells equal in number to a product of the number of message inputs and the number of storage means inputs, said array of logic cells being organized in two dimensions hereinafter referred to as rows and columns, the number of rows equaling the number of storage means inputs and the number of columns equaling the number of message inputs.
   each logic cell except those at the edges of the array comprising:
   (a) means for receiving a message from a cell in an adjacent row,
   (b) means for receiving a message from a cell in an adjacent column,
   (c) means for transmitting a message to a cell in an adjacent column,
   (d) means for transmitting a message to a cell in an adjacent row,
   (e) means for transmitting a message to one of said message outputs, and
   (f) logic means for steering a message to an adjacent row, and adjacent column or a message output,
   each logic cell in one of the rows at the edge of the array comprising:
   (a) means for receiving a message from one of said plurality of message inputs,
   (b) means for receiving a message from a cell in adjacent column,
   (c) means for transmitting a message to a cell in an adjacent column,
   (d) means for transmitting a message to a cell in an adjacent column,
   (e) means for transmitting a message to one of said message outputs, and
   (f) logic means for steering a message to an adjacent row, an adjacent column or a message output.

2. The apparatus of claim 1 wherein the logic means for steering a message comprises:
   logic means for determining among the cells in a column a priority for transmitting messages to one of said message outputs, and
   logic means for controlling the transmitting of a message from one cell to a cell in an adjacent row or column so that a message is transmitted to a cell with a higher priority if one is available in an adjacent row rather than to a cell of equal priority in another column.

3. The apparatus of claim 1 wherein:
   each logic cell in a left hand or a right hand column of the array comprising the same means (a) through (f) except that the cells in one of said columns transmit messages to an input to said storage means rather than to a cell in an adjacent column and the cells in the other of said columns receive messages from an output of said storage means rather than from a cell in an adjacent column;
   each logic cell having a lowest priority comprising the same means (a) through (f) except it receives a message from one of said plurality of message inputs rather than from a cell in an adjacent row; and
   each logic cell having a highest priority comprising the same means (a) through (c), (e) and logic means for steering a message to an adjacent column or a message output.

4. The apparatus of claim 1 wherein the message includes at least one bit of data signifying the presence of a message.

5. The apparatus of claim 1 wherein the addressed message includes at least one bit of data signifying the presence of a message and the routing means comprises:
   first means for examining said bit of data to determine if a message is present;
   second means for examining the address information to determine if the message has reached its destination; and
   means for providing the message to the processor to which it is addressed if said first and second examining means indicate that a message is present and that it has reached its destination.

6. The processor array of claim 1 further comprising means for testing if the routing means has accepted a message.

7. The apparatus of claim 1 further comprising means for acknowledging to a source of said message that the message has been received by the routing means.

8. The apparatus of claim 1 wherein each logic cell except those with the highest priority further comprises:
   (a) means for receiving a signal indicating whether a message is available from a cell in an adjacent row or from a message input,
   (b) means for receiving a signal indicating whether a message is available from a cell in an adjacent column or from an output of said storage means,
   (c) means for transmitting a signal indicating whether a message is available to a cell in an adjacent column or to an input of said storage means,
   (d) means for transmitting a signal indicating whether a message is available to a cell in an adjacent row; and
   each logic cell with the highest priority comprises means (a) through (c) immediately above; and the logic means uses said indicating signals to control the transmission of a message from one cell to another cell or to a message output.

9. The apparatus of claim 1 wherein the storage means further comprises a message ejector comprising:
- a plurality of message inputs equal in number to the number of inputs to said storage means,
- a plurality of message outputs equal in number to the number of inputs to said storage means,
- a message ejector output for ejecting a message,
- means for determining if an addressed message has reached its destination, and
- means for establishing among the inputs to the ejector a priority for transmitting a message that has reached it destination from the inputs to the message ejector output.

10. The apparatus of claim 9 wherein the addressed message includes at least one bit of data signifying the presence of a message and the routing means comprises:
- first means for examining said bit of data to determine if a message is present;
- second means for examining the address information to determine if the message has reached its destination; and
- means for providing the message to the processor to which it is addressed if said first and second examining means indicate that a message is present and that it has reached its destination.

11. The apparatus of claim 9 further comprising means for indicating to the processor from which the message originates that a message has been received by the routing means.

12. The apparatus of claim 9 further comprising means for indicating that a message is available on the message ejector output.

13. The apparatus of claim 1 wherein the storage means further comprises a message injector comprising:
- a plurality of message inputs equal in number to the number of inputs to said storage means,
- a plurality of message outputs equal in number to the number of inputs to said storage means,
- a message injector input for injecting a message,
- means for establishing a priority among the message outputs, and
- means for connecting the message injector input to an available message output having the highest priority.

14. The apparatus of claim 13 further comprising:
- means for receiving in the injector a signal indicating whether a message is available for injection at said message injector input; and
- means associated with each message output for transmitting a signal indicating whether a message is available on said output.

15. The apparatus of claim 13 further comprising means for indicating that a message has been received by said message injector input.

16. The apparatus of claim 1 wherein multiple messages are simultaneously steered through said array of logic cells.

* * * * *